US009109065B2

(12) United States Patent
Ebata et al.

(10) Patent No.: US 9,109,065 B2
(45) Date of Patent: Aug. 18, 2015

(54) ETHYLENE COPOLYMER, COMPOSITION INCLUDING THE COPOLYMER, AND SHAPED ARTICLE AND FILM OR SHEET FORMED FROM THE ETHYLENE COPOLYMER OR THE COMPOSITION

(71) Applicant: Mitsui Chemicals, Inc., Tokyo (JP)

(72) Inventors: Hiroki Ebata, Sodegaura (JP); Yoshiharu Kikuchi, Ichihara (JP); Yuji Ishii, Ichihara (JP); Yoshihisa Matsuo, Tokyo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/350,056

(22) PCT Filed: Oct. 12, 2012

(86) PCT No.: PCT/JP2012/076442
§ 371 (c)(1),
(2) Date: Apr. 4, 2014

(87) PCT Pub. No.: WO2013/054882
PCT Pub. Date: Apr. 18, 2013

(65) Prior Publication Data
US 2014/0296423 A1  Oct. 2, 2014

(30) Foreign Application Priority Data

Oct. 13, 2011 (JP) ................. 2011-225677
Oct. 13, 2011 (JP) ................. 2011-225678

(51) Int. Cl.
*C08F 210/18* (2006.01)
*C08L 23/16* (2006.01)
(Continued)

(52) U.S. Cl.
CPC ............... *C08F 210/18* (2013.01); *C08K 5/01* (2013.01); *C08L 23/083* (2013.01); *C08L 23/0823* (2013.01); *C08L 23/16* (2013.01)

(58) Field of Classification Search
CPC ...... C08F 210/18; C08F 2500/17; C08L 23/16
USPC ............ 526/348, 281, 339; 525/331.9, 332.1, 525/332.8
IPC ....................................... C08F 210/18, 2500/17
See application file for complete search history.

(56) References Cited

U.S. PATENT DOCUMENTS 4,990,640 A   2/1991 Tsutsui et al.
(Continued)

FOREIGN PATENT DOCUMENTS

JP          53-119946          10/1978
(Continued)

OTHER PUBLICATIONS

Hsieh et al., "Ethylene-1-Butene Copolymers. 1. Comonomer Sequence Distribution," *Macromolecules*, vol. 15, pp. 353-360 (1982).

(Continued)

*Primary Examiner* — Rip A Lee
(74) *Attorney, Agent, or Firm* — Foley & Lardner LLP

(57) ABSTRACT

Objects of the invention are to obtain ethylene copolymers which have excellent rubber elasticity even without being crosslinked and maintain sufficient shaping processability even when filled with significantly large amounts of additives, and to provide methods for producing with good productivity films or sheets having flexibility and high stretchability. The invention is directed to an ethylene copolymer (X) including structural units derived from a component [A], a component [B] and a component [C] which are ethylene [A], an α-olefin of 3 to 20 carbon atoms [B] and a polyene and/or a cyclic olefin [C]. In the ethylene copolymer, (1) the content of structural units derived from the ethylene [A] is in the range of 50 to 90 mol % in 100 mol % of all the structural units in the copolymer (X); (2) the content of structural units derived from at least one polyene and/or the cyclic olefin [C] is in the range of 1.0 to 5.0 mol % in 100 mol % of all the structural units in the copolymer (X); and (3) the intrinsic viscosity [η] of the ethylene copolymer (X) as measured at 135° C. in a decalin solution is in the range of 7.8 to 13.0 dl/g. The invention also concerns with a composition including the ethylene copolymer (X), and uses.

19 Claims, 1 Drawing Sheet

(51) Int. Cl.
*C08K 5/01* (2006.01)
*C08L 23/08* (2006.01)

(56) References Cited

U.S. PATENT DOCUMENTS

| | | | |
|---|---|---|---|
| 5,292,845 A * | 3/1994 | Kawasaki et al. | 526/336 |
| 5,610,254 A * | 3/1997 | Sagane et al. | 526/282 |
| 5,955,524 A | 9/1999 | Azuma et al. | |
| 6,040,407 A * | 3/2000 | Ishida et al. | 526/281 |
| 6,084,046 A * | 7/2000 | Johoji et al. | 526/339 |
| 6,140,441 A * | 10/2000 | Hakuta et al. | 526/348 |
| 6,159,614 A | 12/2000 | Azuma et al. | |
| 6,403,742 B2 * | 6/2002 | Oshima et al. | 526/281 |
| 6,441,093 B2 * | 8/2002 | Tominaga et al. | 525/191 |
| 6,787,623 B1 * | 9/2004 | Murakami et al. | 526/308 |
| 6,939,928 B1 | 9/2005 | Kawai et al. | |
| 7,393,965 B2 | 7/2008 | Tohi et al. | |
| 7,449,533 B2 | 11/2008 | Kawai et al. | |
| 7,956,140 B2 * | 6/2011 | Ijpeij et al. | 526/160 |
| 8,101,254 B2 * | 1/2012 | Noguchi et al. | 428/36.8 |
| 8,188,191 B2 * | 5/2012 | Ikenaga et al. | 525/245 |
| 2008/0064818 A1 * | 3/2008 | Murakami et al. | 525/241 |
| 2008/0220193 A1 | 9/2008 | Tohi et al. | |

FOREIGN PATENT DOCUMENTS

| | | |
|---|---|---|
| JP | 2-78687 | 3/1990 |
| JP | 06-001893 | 1/1994 |
| JP | 06-128330 | 5/1994 |
| JP | 06-248093 | 9/1994 |
| JP | 08-067778 | 3/1996 |
| JP | 8-319382 | 3/1996 |
| JP | 09-151283 | 6/1997 |
| JP | 2000-212194 | 8/2000 |
| JP | 2001-172448 | 6/2001 |
| JP | 2001-294713 | 10/2001 |
| JP | 2001-522398 | 11/2001 |
| JP | 2004-168744 | 6/2004 |
| JP | 2004-175759 | 6/2004 |
| JP | 2006-348095 | 12/2006 |
| JP | 2007-099942 | 4/2007 |
| JP | 2011/001497 | 1/2011 |
| WO | WO 98/49212 | 11/1998 |
| WO | WO 01/27124 A1 | 4/2001 |
| WO | WO 2006/123759 | 11/2006 |
| WO | WO 2009/081792 A1 | 7/2009 |
| WO | WO 2009/081794 A1 * | 7/2009 ............ C08F 4/6592 |

OTHER PUBLICATIONS

Ray et al., "Carbon-13 Nuclear Magnetic Resonance Determination of Monomer Composition and Sequence Distributions in Ethylene-Propylene Copolymers Prepared with a Stereoregular Catalyst System," *Ethylene-Propylene Copolymers*, vol. 10, No. 4, pp. 773-778 (1977).

Patsidis et al., The Synthesis, Characterization and Polymerization Behavior of Ansa Cyclopentadienyl Fluorenyl Complexes; the X-Ray Structures of the Complexes $[(C_{13}H_8)SiR_2(C_5H_4)]ZrCl_2$ (R=Me or Ph), *Journ. of Organometallic Chem.*, vol. 509, pp. 63-71 (1996).

International Search Report issued in related International Patent Application No. PCT/JP2012/076442, completed Dec. 12, 2012.

* cited by examiner

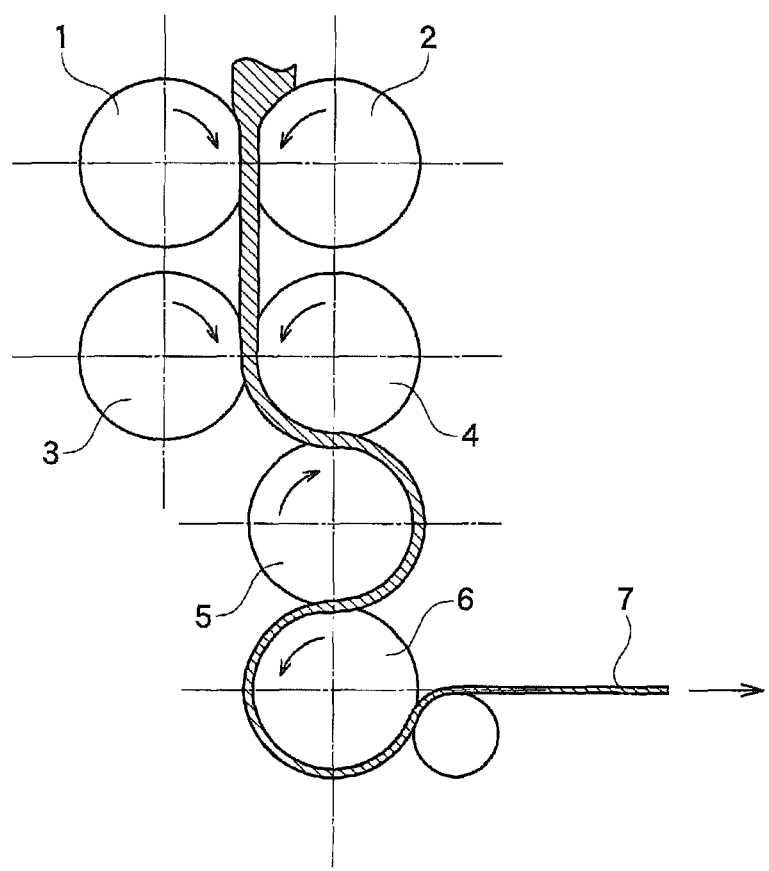

ETHYLENE COPOLYMER, COMPOSITION INCLUDING THE COPOLYMER, AND SHAPED ARTICLE AND FILM OR SHEET FORMED FROM THE ETHYLENE COPOLYMER OR THE COMPOSITION

This application is a National Phase of International Patent Application No. PCT/JP2012/076442, filed Oct. 12, 2012, which claims priority from Japanese Patent Application Nos. 2011-225677, filed Oct. 13, 2011, and 2011-225678, filed Oct. 13, 2011. The contents of these applications are incorporated herein by reference in their entirety.

TECHNICAL FIELD

The present invention relates to ethylene copolymers which have excellent rubber elasticity even without being crosslinked and exhibit excellent shaping processability and mechanical characteristics even when combined with large amounts of inorganic fillers and plasticizers such as process oils, as well as to compositions including the copolymers, and shaped articles and films or sheets formed from the ethylene copolymers or the compositions.

BACKGROUND ART

Because of the absence of unsaturated bonds in the main chain, ethylene·α-olefin copolymers and ethylene·α-olefin·non-conjugated diene copolymers outperform diene rubbers in terms of weather resistance, heat resistance and ozone resistance and are therefore widely used in products such as automobile industrial parts, industrial rubber products, electrical insulating materials, civil engineering and building articles, and rubber products including rubber-coated fabrics.

In particular, ethylene·α-olefin·non-conjugated polyene copolymers have found a wide use because of the fact that the double bonds derived from the non-conjugated polyenes can participate in crosslinking reactions and the copolymers, by undergoing the crosslinking reactions, can achieve a further increase in strength and rubber elasticity of rubber products.

The production of rubber products using ethylene·α-olefin·non-conjugated diene copolymers usually involves the addition of large amounts of inorganic fillers such as carbon blacks, calcium carbonate and talcs and plasticizers such as process oils.

However, the addition of large amounts of inorganic fillers such as carbon blacks, calcium carbonate and talcs and plasticizers such as process oils results in a marked decrease in shaping processability such as rolling processability and extrusion processability as well as in a marked deterioration in mechanical characteristics and rubber elasticity of rubber products obtained by crosslinking.

For example, one approach which has been proposed in order to obtain ethylene·α-olefin·non-conjugated diene copolymers with excellent fillability is to use an ethylene·α-olefin·non-conjugated diene copolymer which has an intrinsic viscosity [η] measured at 135° C. in decalin solvent of 3.7 to 4.1 dl/g (Patent Literature 1: JP-A-H06-1893), or to use an ethylene·α-olefin·non-conjugated diene copolymer having high molecular weight such as a copolymer (A) which includes ethylene, an α-olefin of 6 to 12 carbon atoms and a cyclic non-conjugated diene and has a polystyrene equivalent mass average molecular weight (Mw) in the range of 450,000 to 3,000,000 or a copolymer (B) which includes ethylene, propylene, an α-olefin of 6 to 12 carbon atoms and a cyclic non-conjugated diene and has a similar molecular weight (Patent Literature 2: JP-A-H09-151283).

However, even the use of the ethylene·α-olefin·non-conjugated diene copolymer disclosed in Patent Literature 1 or Patent Literature 2 (with an intrinsic viscosity [η] of about 4 dl/g) does not allow the desired rubber elasticity to be exhibited without crosslinking and thus it is difficult for such a copolymer to be used in applications where the copolymer is filled with significantly large amounts of additives.

Although Patent Literature 2 does not disclose any intrinsic viscosity [η] values, EP98A, product name, manufactured by JSR Corporation that is described in Comparative Example 3 [an ethylene/propylene/5-ethylidene-2-norbornene random copolymer having ethylene content: 75.9 mol %, propylene content: 22.6 mol %, ENB content: 1.16 mol %, Mw 1,179,000 and Mw/Mn 4.4, and containing 75 parts by mass of a paraffin process oil as an extender oil] was obtained and the intrinsic viscosity [η] of the random copolymer was measured after the removal of the extender oil, the measurement resulting in 4.45 dl/g.

In one shaping method, a film or sheet having a constant thickness is continuously formed by rolling a thermoplastic polymer through two or more rolls (a calendering method).

The calendering method achieves a higher output than by a usual extrusion method and thus allows films or sheets to be produced at low cost. Conventionally, the calendering method most often involves polyvinyl chloride containing various plasticizers, and is used in mass production of articles such as leathers, sheets and films. In recent years, due to the VOC problem associated with polyvinyl chloride and also because the incineration of wastes causes problematic generation of gas, there has been a demand that the material be replaced by alternatives.

Materials including olefin polymers have been regarded as promising alternatives to polyvinyl chloride. However, highly crystalline materials such as high-density polyethylenes and polypropylenes have problems in flexibility and also exhibit a drastic change in viscosity when being molten. Thus, these materials have problems such as that the suitable range in which calendering is feasible is limited, that the materials exhibit poor releasability from the calender rolls, and that the calendered products have low surface smoothness and tend to be nonuniform in thickness.

On the other hand, α-olefin copolymers, which are low crystalline olefin materials, have very low calendering properties due to such problems as poor release and engagement failure. The term poor release means that the resin is not separated from the rolls and becomes twisted around the rolls. The term engagement failure means that the resin is not engaged between the rolls and the bank continues to increase its size. These problems tend to be worsened when the materials are formulated to become more flexible by the addition of plasticizers such as oils.

Many solutions to the above problems have been proposed. For example, Patent Literature 3 discloses a blend suited for calendering which includes a broad molecular weight distribution polypropylene. Patent Literature 4 discloses a calendering method which involves a composition including a propylene/ethylene random copolymer and a propylene/ethylene block copolymer. Patent Literature 5 proposes a soft syndiotactic polypropylene composition based on a syndiotactic propylene polymer and including a syndiotactic structure propylene·ethylene copolymer, an amorphous α-olefin copolymer, an ethylene·α-olefin copolymer and an isotactic propylene polymer.

In order to improve the releasability from calender rolls, Patent Literature 6 discloses a composition including a polypropylene resin composition and an aliphatic monocarboxylic acid metal salt. However, no films with sufficient performance have been obtained.

CITATION LIST

Patent Literature

Patent Literature 1: JP-A-H06-1893
Patent Literature 2: JP-A-H09-151283
Patent Literature 3: JP-A-H08-67778
Patent Literature 4: JP-A-S53-119946
Patent Literature 5: JP-A-2001-172448
Patent Literature 6: JP-A-H08-319382

SUMMARY OF INVENTION

Technical Problem

Objects of the present invention are to obtain ethylene copolymers which have excellent rubber elasticity even without being crosslinked and maintain sufficient shaping processability even when filled with significantly large amounts of additives, to provide crosslinked products having good mechanical properties, to provide films or sheets having flexibility and high stretchability, and to provide methods capable of producing with good productivity films or sheets having flexibility and high stretchability.

Solution to Problem

The present invention is directed to an ethylene copolymer (X) that has the characteristics (1) to (3) described below and includes structural units derived from a component [A], a component [B] and a component [C] which are ethylene [A], an α-olefin of 3 to 20 carbon atoms [B] and a polyene and/or a cyclic olefin [C], as well as directed to an ethylene copolymer composition including the copolymer (X), a film or sheet including the copolymer (X), and a film or sheet formed from the composition.

(1) The content of structural units derived from the ethylene [A] is in the range of 50 to 90 mol % in 100 mol % of all the structural units in the copolymer (X);

(2) the content of structural units derived from at least one polyene and/or the cyclic olefin [C] is in the range of 1.0 to 5.0 mol % in 100 mol % of all the structural units in the copolymer (X); and (3) the intrinsic viscosity [η] of the ethylene copolymer (X) as measured at 135° C. in a decalin solution is in the range of 7.8 to 13.0 dl/g.

In terms of flexibility and stretchability, it is preferable that the durometer type A hardness of the film or sheet measured by a method specified in JIS K 6253 be 10 to 80.

In order to reduce the residual strain after stretching, it is preferable that at least part of the film or sheet have been crosslinked, in particular, crosslinked by electron beam irradiation.

In terms of crosslinking reactivity, it is preferable that the component [C] be 5-ethylidene-2-norbornene (ENB).

In terms of mechanical characteristics and shaping processability, it is preferable that the component [B] be propylene or 1-butene.

The present invention is also directed to an ethylene copolymer composition including 100 parts by mass of the ethylene copolymer (X) and 100 to 500 parts by mass of a plasticizer (Y).

In terms of rubber elasticity in an uncrosslinked state, it is preferable that the ethylene copolymer composition have a loss tangent (tan δ) at 190° C. and 0.01 rad/sec of 0.1 to 1.0.

Advantageous Effects of Invention

The ethylene copolymer (X) according to the invention has excellent mechanical characteristics by itself regardless of whether or not the copolymer is crosslinked. Further, the inventive ethylene copolymer (X) can be combined with large amounts of plasticizers and other additives per 100 parts by mass of the ethylene copolymer (X). Even in the case where such additives are added in significantly large amounts exceeding 700 parts by mass in total, the resultant composition shows good shaping processability and can exhibit excellent mechanical characteristics and rubber elasticity regardless of whether or not it is crosslinked. Thus, the invention can provide novel materials.

The film or sheet produced using the inventive ethylene copolymer (X) has flexibility and high stretchability.

In particular, films or sheets obtained by electron beam crosslinking exhibit a markedly small residual strain after the films or sheets are stretched.

Further, the inventive ethylene copolymer (X) and the ethylene copolymer composition including the ethylene copolymer (X) can be produced into films or sheets by calendering, and show good shaping properties during the production.

BRIEF DESCRIPTION OF DRAWING

FIG. 1 is a view illustrating a roll configuration of complex six calender rolls used in Examples.

DESCRIPTION OF EMBODIMENTS

[Ethylene Copolymers (X)]

An ethylene copolymer (X) according to the invention includes structural units derived from a component [A], a component [B] and a component [C] which are ethylene [A], an α-olefin of 3 to 20 carbon atoms [B] and a polyene and/or a cyclic olefin [C]. The ethylene copolymer (X) is an ethylene copolymer characterized in that:

(1) the content of structural units derived from the ethylene [A] is in the range of 50 to 90 mol %, preferably 55 to 85 mol %, and more preferably 55 to 83 mol % in 100 mol % of all the structural units in the copolymer (X);

(2) the content of structural units derived from at least one polyene and/or the cyclic olefin [C] is in the range of 1.0 to 5.0 mol %, preferably 1.0 to 4.0 mol %, and more preferably 1.0 to 3.5 mol % in 100 mol % of all the structural units in the copolymer (X); and (3) the intrinsic viscosity [η] of the ethylene copolymer (X) as measured at 135° C. in a decalin solution is in the range of 7.8 to 13.0 dl/g, preferably 8.0 to 13.0 dl/g, more preferably 8.0 to 12.0 dl/g, and still more preferably 8.5 to 12.0 dl/g.

The above (1) to (3) will be described in detail hereinbelow.

⟨(1) [A] Ethylene⟩

Structural units derived from ethylene [A] (hereinafter, also referred to simply as "component [A]") give low-temperature impact resistance and excellent mechanical strength to rubber shaped articles obtained by shaping and crosslinking an ethylene copolymer composition including the inventive ethylene copolymer (X) (hereinafter, sometimes referred to simply as "copolymer (X)").

The proportion of the structural units derived from ethylene [A] in all the structural units in the inventive copolymer (X) may be measured by any of various known methods. For example, the proportion may be determined by measuring a $^1$H-NMR spectrum.

⟨[B] α-Olefins of 3 to 20 Carbon Atoms⟩

Structural units derived from an α-olefin of 3 to 20 carbon atoms [B] (hereinafter, also referred to simply as "component [B]") give flexibility (low crystallinity) to the ethylene copolymer (X) of the invention.

From the viewpoints of material costs, mechanical characteristics of the inventive copolymer (X), and rubber elasticity of shaped articles obtained from a composition described later which includes the copolymer, the number of carbon atoms in the component [B] is preferably 3 to 20. Preferably, the α-olefin has 3 to 8 carbon atoms, and is more preferably propylene or 1-butene, and particularly preferably propylene.

Examples of the components [B] include propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. Of these, propylene, 1-butene, 1-hexene and 1-octene are preferable, propylene and 1-butene are more preferable, and propylene is particularly preferable.

The components [B] may be used singly, or two or more kinds may be used in combination.

In terms of flexibility of the inventive copolymer (X) and low-temperature impact resistance of inventive rubber shaped articles, the content of the structural units derived from the component [B] is usually 9 to 49 mol %, and preferably 14 to 44 mol % in 100 mol % of all the structural units in the inventive copolymer (X).

The proportion of the structural units derived from the component [B] in all the structural units in the inventive copolymer may be measured by any of various known methods. For example, the proportion may be determined by measuring a $^1$H-NMR spectrum.

⟨(2) [C] At Least One Polyene and/or Cyclic Olefin⟩

Structural units derived from at least one polyene and/or the cyclic olefin [C] (hereinafter, also referred to simply as "component [C]") give crosslinking reactivity to the inventive ethylene copolymer (X).

The at least one polyene [C-1] (hereinafter, also referred to simply as "component [C-1]"), which is one of the components [C] in the invention, is not particularly limited as long as the compound has two or more (usually four or less) double bonds and the double bonds are not conjugated. From the viewpoint of costs, however, non-conjugated dienes of 5 to 20 carbon atoms are preferable, and non-conjugated dienes of 5 to 15 carbon atoms are more preferable.

Examples of the non-conjugated dienes include cyclic non-conjugated dienes such as 5-ethylidene-2-norbornene (ENB), dicyclopentadiene, 5-vinyl-2-norbornene (VNB), norbornadiene and methyltetrahydroindene, and chain non-conjugated dienes such as 1,4-hexadiene and 7-methyl-1,6-octadiene.

Of these, 5-ethylidene-2-norbornene (ENB), dicyclopentadiene and 5-vinyl-2-norbornene (VNB) are preferably used, and 5-ethylidene-2-norbornene (ENB) is particularly preferably used.

The cyclic olefin [C-2], which is one of the components [C] in the invention, is an unsaturated monocyclic hydrocarbon having one carbon-carbon double bond in the ring. Specific examples of the cyclic olefins include cyclopentene, cycloheptene, cyclohexene, norbornene, 5-methyl-2-norbornene, tetracyclododecene and 2-methyl-1,4,5,8-dimethano-1,2,3,4,4a,5,8,8a-octahydro-naphthalene.

The components [C] in the invention may be used singly, or two or more kinds may be used in combination.

The proportion of the structural units derived from the at least one polyene and/or the cyclic olefin [C] in all the structural units in the inventive copolymer may be measured by any of various known methods. For example, the proportion may be determined by measuring a $^1$H-NMR spectrum.

In the ethylene copolymer (X) of the invention, it is preferable that the component [C] be a non-conjugated polyene; in particular, a non-conjugated diene is preferable, and ENB is particularly preferable.

⟨(3) Intrinsic viscosity [η]⟩

The ethylene copolymer (X) of the invention has an intrinsic viscosity [η] in the aforementioned range as measured at 135° C. in a decalin solution. This ensures that excellent rubber elasticity is exhibited even without crosslinking.

An ethylene copolymer with an intrinsic viscosity [η] less than the aforementioned range may be plastically deformed when it contains a large amount of a plasticizer. On the other hand, an ethylene copolymer having an intrinsic viscosity [η] exceeding the aforementioned range may cause problems during production.

The ethylene copolymer (X) of the invention preferably has (i) a value B of 0.9 to 1.0, the value B being obtained from a $^{13}$C-NMR spectrum based on the following equation:

Value $B=[P_{OE}]/(2\cdot[P_E]\cdot[P_O])$ (in the equation, $[P_E]$ is the molar fraction of the content of the units derived from ethylene (a) in the random copolymer, $[P_O]$ is the molar fraction of the content of the units derived from the α-olefin (b) in the random copolymer, and $[P_{OE}]$ is the proportion of the number of α-olefin·ethylene chains relative to the number of all the dyad chains in the random copolymer); and (ii) a loss tangent value, tan δ, of not more than 0.1 as determined by dynamic viscoelasticity measurement at −10° C. and 1 Hz.

The value B is an indicator of the distribution state of ethylene and the α-olefin in the ethylene copolymer (X), and may be determined based on the reports by J. C. Randall (Macromolecules, 15, 353 (1982)) and J. Ray (Macromolecules, 10, 773 (1977)).

The ethylene copolymer satisfying the above (i) and (ii) achieves excellent rubber characteristics at a low temperature region.

[Methods for Producing Ethylene Copolymers (X)]

The ethylene copolymers (X) according to the invention may be produced using metallocene catalysts. In detail, the copolymers can be produced by the following methods.

Catalyst Example 1

Examples of the metallocene catalysts include transition metal compounds represented by General Formula [I] or [II] below.

[Chem. 1]

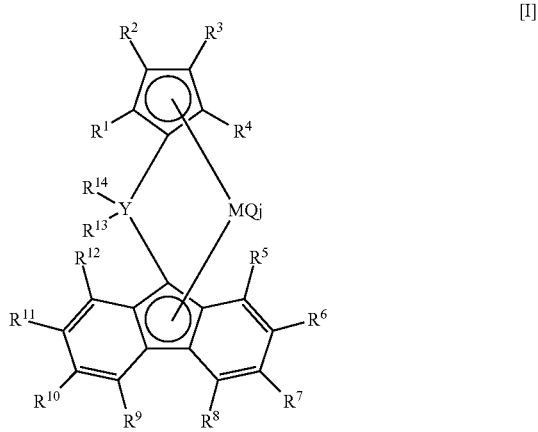

-continued

[Chem. 2]

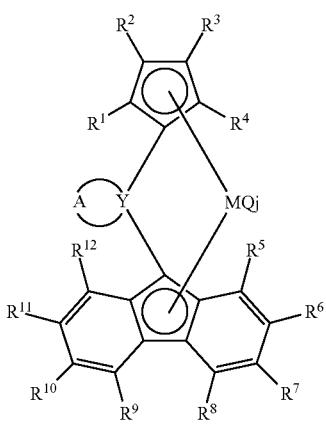

[II]

In General Formulae [I] and [III], Y is a silicon atom or a carbon atom.

In General Formulae [I] and [III], $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ may be the same or different from one another and are each selected from a hydrogen atom, a halogen atom, an optionally halogenated hydrocarbon group of 1 to 20 carbon atoms and a silicon-containing group, and adjacent substituents of $R^1$ to $R^{14}$ may be linked to each other to form a ring.

Examples of the halogen atoms include fluorine atom, chlorine atom, bromine atom and iodine atom.

Examples of the hydrocarbon groups of 1 to 20 carbon atoms include alkyl groups of 1 to 20 carbon atoms, arylalkyl groups of 7 to 20 carbon atoms, and aryl groups and substituted aryl groups of 6 to 20 carbon atoms.

Specific examples include methyl group, ethyl group, n-propyl group, isopropyl group, allyl group, n-butyl group, isobutyl group, sec-butyl group, t-butyl group, amyl group, n-pentyl group, neopentyl group, n-hexyl group, n-heptyl group, n-octyl group, n-nonyl group, n-decanyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, 1-methyl-1-isopropyl-2-methylpropyl group, cyclopentyl group, cyclohexyl group, cycloheptyl group, cyclooctyl group, norbornyl group, adamantyl group, phenyl group, o-tolyl group, m-tolyl group, p-tolyl group, xylyl group, isopropylphenyl group, t-butylphenyl group, naphthyl group, biphenyl group, terphenyl group, phenanthryl group, anthracenyl group, benzyl group and cumyl group. Examples of the hydrocarbon groups further include those containing oxygen-containing groups such as methoxy group, ethoxy group and phenoxy group, nitrogen-containing groups such as nitro group, cyano group, N-methylamino group, N,N-dimethylamino group and N-phenylamino group, boron-containing groups such as boranetriyl group and diboranyl group, and sulfur-containing groups such as sulfonyl group and sulfenyl group.

Any hydrogen atoms of the above hydrocarbon groups may be substituted by halogen atoms. Examples of such halogenated hydrocarbon groups include trifluoromethyl group, trifluoromethylphenyl group, pentafluorophenyl group and chlorophenyl group.

Examples of the silicon-containing groups include silyl groups, siloxy groups, hydrocarbon-substituted silyl groups and hydrocarbon-substituted siloxy groups. Specific examples include methylsilyl group, dimethylsilyl group, trimethylsilyl group, ethylsilyl group, diethylsilyl group, triethylsilyl group, diphenylmethylsilyl group, triphenylsilyl group, dimethylphenylsilyl group, dimethyl-t-butylsilyl group and dimethyl(pentafluorophenyl)silyl group.

Examples of the cyclopentadienyl groups with $R^1$ to $R^4$ in General Formulae [I] and [III] include but are not limited to unsubstituted cyclopentadienyl group in which $R^1$ to $R^4$ are hydrogen atoms; 3-monosubstituted cyclopentadienyl groups such as 3-t-butylcyclopentadienyl group, 3-methylcyclopentadienyl group, 3-trimethylsilylcyclopentadienyl group, 3-phenylcyclopentadienyl group, 3-adamantylcyclopentadienyl group, 3-amylcyclopentadienyl group and 3-cyclohexylcyclopentadienyl group; and 3,5-disubstituted cyclopentadienyl groups such as 3-t-butyl-5-methylcyclopentadienyl group, 3-t-butyl-5-ethylcyclopentadienyl group, 3-phenyl-5-methylcyclopentadienyl group, 3,5-di-t-butylcyclopentadienyl group, 3,5-dimethylcyclopentadienyl group, 3-phenyl-5-methylcyclopentadienyl group and 3-trimethylsilyl-5-methylcyclopentadienyl group.

The unsubstituted ($R^1$ to $R^4$ being hydrogen atoms) cyclopentadienyl group is preferable because of easy synthesis of the transition metal compounds, production costs, and performance in the copolymerization of the non-conjugated polyenes [C].

Examples of the fluorenyl groups with $R^5$ to $R^{12}$ in General Formulae [I] and [III] include but are not limited to unsubstituted fluorenyl group in which $R^5$ to $R^{12}$ are hydrogen atoms; 2-monosubstituted fluorenyl groups such as 2-methylfluorenyl group, 2-t-butylfluorenyl group and 2-phenylfluorenyl group; 4-monosubstituted fluorenyl groups such as 4-methylfluorenyl group, 4-t-butylfluorenyl group and 4-phenylfluorenyl group; 2,7- or 3,6-disubstituted fluorenyl groups such as 2,7-di-t-butylfluorenyl group and 3,6-di-t-butylfluorenyl group; 2,3,6,7-tetrasubstituted fluorenyl groups such as 2,7-dimethyl-3,6-di-t-butylfluorenyl group and 2,7-diphenyl-3,6-di-t-butylfluorenyl group; and 2,3,6,7-tetrasubstituted fluorenyl groups represented by General Formulae [V-I] and [V-II] below wherein $R^6$ and $R^7$ are linked together to form a ring and $R^{10}$ and $R^{11}$ are linked together to form a ring.

[Chem. 3]

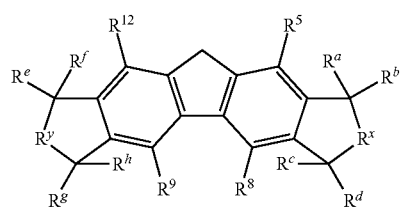

[V-I]

[Chem. 4]

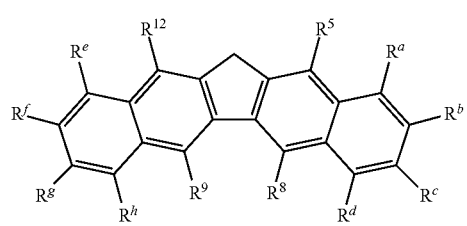

[V-II]

In General Formulae [V-I] and [V-II], $R^5$, $R^8$, $R^9$ and $R^{12}$ are the same as defined in General Formula [I] or [III]; and $R^a$, $R^b$, $R^c$, $R^d$, $R^e$, $R^f$, $R^g$ and $R^h$ are each independently a hydrogen atom or an alkyl group of 1 to 5 carbon atoms, and may be linked to adjacent substituents to form a ring.

Specific examples of the alkyl groups include methyl group, ethyl group, n-propyl group, isopropyl group, n-butyl group, t-butyl group, amyl group and n-pentyl group.

In General Formula [V-I], $R^x$ and $R^y$ are each independently a hydrocarbon group of 1 to 3 carbon atoms which may have an unsaturated bond; $R^x$ may form a double bond with the carbon atom to which $R^a$ or $R^e$ is bonded; $R^y$ may form a double bond with the carbon atom to which $R^e$ or $R^g$ is bonded; and $R^x$ and $R^y$ are preferably both saturated or unsaturated hydrocarbon groups of 1 or 2 carbon atoms.

Specific examples of the compounds represented by General Formula [V-I] or [V-II] include octamethyloctahydrodibenzofluorenyl group of Formula [V-III] below, tetramethyldodecahydrodibenzofluorenyl group of Formula [V-IV] below, octamethyltetrahydrodicyclopentafluorenyl group of Formula [V-V] below, hexamethyldihydrodicyclopentafluorenyl group of Formula [V-VI] below and b,h-dibenzofluorenyl group of Formula [V-VII] below.

[Chem. 5]

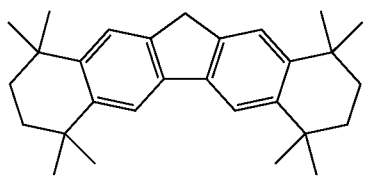

[V-III]

[Chem. 6]

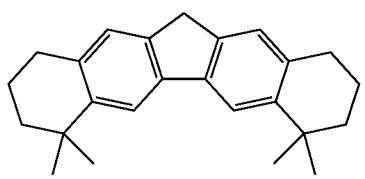

[V-IV]

[Chem. 7]

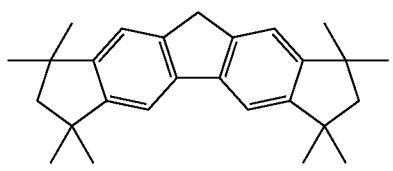

[V-V]

[Chem. 8]

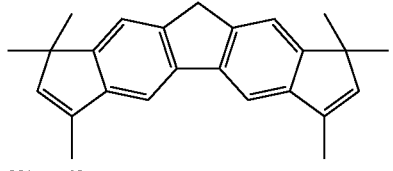

[V-VI]

[Chem. 9]

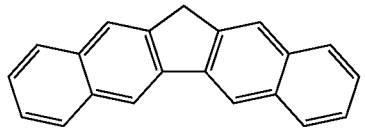

[V-VII]

The transition metal compounds of General Formula [I] or [II] containing these fluorenyl groups each shows an excellent performance in the copolymerization of the at least one polyene and/or the cyclic olefin [C]. When Y is a silicon atom, the transition metal compounds that have a 2,7-disubstituted fluorenyl group, a 3,6-disubstituted fluorenyl group, a 2,3,6,7-tetrasubstituted fluorenyl group or a 2,3,6,7-tetrasubstituted fluorenyl group of General Formula [V-I] show particularly excellent performance. When Y is a carbon atom, the transition metal compounds that have an unsubstituted fluorenyl group with $R^5$ to $R^{12}$ being hydrogen atoms, a 3,6-disubstituted fluorenyl group, a 2,3,6,7-tetrasubstituted fluorenyl group or a 2,3,6,7-tetrasubstituted fluorenyl group of General Formula [V-I] show a particularly excellent performance in the copolymerization of the non-conjugated polyenes [C].

In both cases in which Y is a silicon atom or a carbon atom, particularly excellent polymerization activity is achieved by the transition metal compounds of General Formulae [I] and [II] which have a 2,7-disubstituted fluorenyl group, a 3,6-disubstituted fluorenyl group, a 2,3,6,7-tetrasubstituted fluorenyl group or a 2,3,6,7-tetrasubstituted fluorenyl group of General Formula [V-I].

In General Formula [II], $R^{13}$ and $R^{14}$ may be the same or different from each other. As already mentioned, $R^{13}$ and $R^{14}$ may be hydrocarbon groups. Of the hydrocarbon groups, methyl group, ethyl group, n-propyl group, isopropyl group, n-butyl group, isobutyl group, t-butyl group, cyclopentyl group, cyclohexyl group, cycloheptyl group, phenyl group, m-tolyl group, p-tolyl group, 4-t-butylphenyl group, p-chlorophenyl group, 4-biphenyl group, 2-naphthyl group, xylyl group, benzyl group and m-trifluoromethylphenyl group are preferable.

In the transition metal compounds represented by General Formula [II], A is a divalent and saturated or unsaturated hydrocarbon group of 2 to 20 carbon atoms which may include an aromatic ring, and Y and A are linked together to form, for example, a structure such as a cycloalkylidene group such as cyclohexylidene group represented by Formula [VI-I] below or a cyclomethylenesilylene group such as cyclotetramethylenesilylene group (1-silacyclopentylidene group) represented by Formula [VI-II] below.

[Chem. 10]

[VI-I]

[VI-II]

(In Formulae [VI-I] and [VI-II], the black dots • represent bonding points with the (substituted) cyclopentadienyl group and the (substituted) fluorenyl group in General Formula [II].)

In General Formula [II], the group A may contain two or more ring structures including the ring it forms with Y.

Specific examples of the ring structures formed by the bonding of Y with A, other than the cyclohexylidene group represented by Formula [VI-I] above, include cyclopropylidene group, cyclobutylidene group, cyclopentylidene group, cycloheptylidene group, cyclooctylidene group, bicyclo[3.3.1]nonylidene group, norbornylidene group, adamantylidene group, tetrahydronaphthylidene group and dihydroindanylidene group.

Similarly, specific examples of the ring structures formed by the bonding of Y with A, other than the cyclotetramethylenesilylene group (1-silacyclopentylidene group) represented by Formula [VI-II] above, include cyclodimethylenesilylene group, cyclotrimethylenesilylene group, cyclopentamethylenesilylene group, cyclohexamethylenesilylene group and cycloheptamethylenesilylene group.

In General Formulae [I] and [III], M is a titanium atom, a zirconium atom or a hafnium atom, and is preferably a titanium atom or a hafnium atom.

In General Formulae [I] and [III], Q is selected from halogen atoms, hydrocarbon groups of 1 to 10 carbon atoms, neutral and conjugated or non-conjugated dienes of 10 or less carbon atoms, anionic ligands, and neutral ligands capable of coordination by lone pair electrons.

Specific examples of the halogen atoms include fluorine atom, chlorine atom, bromine atom and iodine atom, with chlorine atom being preferable.

Specific examples of the hydrocarbon groups of 1 to 10 carbon atoms include methyl group, ethyl group, n-propyl group, isopropyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, t-butyl group, 1,1-dimethylbutyl group, 1,1,3-trimethylbutyl group, neopentyl group, cyclohexylmethyl group, cyclohexyl group, 1-methyl-1-cyclohexyl group and benzyl group, with methyl group, ethyl group and benzyl group being preferable.

Specific examples of the neutral and conjugated or non-conjugated dienes of 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Specific examples of the anionic ligands include alkoxy groups such as methoxy, t-butoxy and phenoxy, carboxylate groups such as acetate and benzoate, and sulfonate groups such as mesylate and tosylate.

Specific examples of the neutral ligands capable of coordination by lone electron pairs include organophosphorus compounds such as trimethylphosphine, triethylphosphine, triphenylphosphine and diphenylmethylphosphine, and ethers such as tetrahydrofuran, diethyl ether, dioxane and 1,2-dimethoxyethane.

Lastly, j in General Formulae [I] and [III] is an integer of 1 to 4. When j is 2 or greater, the plurality of Q may be the same or different from one another.

Examples of the transition metal compounds discussed above are described in JP-A-2011-1497.

The transition metal compounds may be produced by known methods, and the production methods are not particularly limited. Exemplary production methods are described in J. Organomet. Chem., 63, 509 (1996) and WO 2006-123759, WO 01/27124, JP-A-2004-168744, JP-A-2004-175759 and JP-A-2000-212194 filed by the present applicant.

Catalyst Example 2

Examples of the metallocene catalysts which may be used in the production of the inventive ethylene copolymers (X) further include compounds represented by General Formula (X) below.

[Chem. 11]

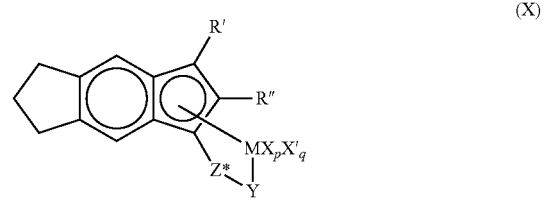

(X)

In Formula (X), R' and R'' are each independently a hydrogen atom or a hydrocarbyl group of 1 to 20 carbon atoms, M is titanium, Y is —NR*—, is —SiR*$_2$—, the two R*s are each independently a hydrogen atom or a hydrocarbyl group of 1 to 20 carbon atoms, p and q are such that one is 0 and the other is 1, when p is 0 and q is 1, M is in the +2 oxidized state and X' is 1,4-diphenyl-1,3-butadiene or 1,3-pentadiene, and when p is 1 and q is 0, M is in the +3 oxidized state and X is 2-(N,N-dimethylamino)benzyl.

From the viewpoint that the obtainable ethylene copolymer is suppressed from the occurrence of fogging and stickiness due to ultralow-molecular weight components, a particularly preferred compound having a structure represented by General Formula (X) is (t-butylamido)dimethyl ($\eta^5$-2-methyl-s-indacen-1-yl)silanetitanium (II) 1,3-pentadiene (a compound having a structure represented by Formula (XI) below). For example, the compound having a structure of Formula (XI) below may be obtained by a method described in JP-A-2001-522398.

[Chem. 12]

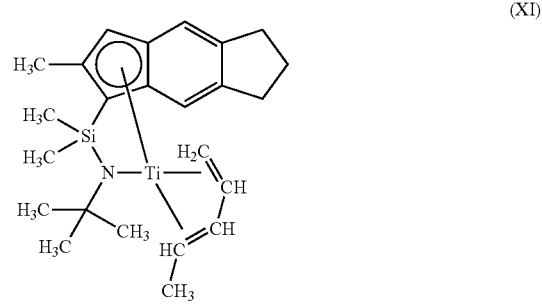

(XI)

The compounds having a structure of General Formula (X) provide excellent polymerizability of the at least one polyene and/or the cyclic olefin [C]. Further, the ethylene copolymer (X) of the invention synthesized with such a metallocene catalyst has a narrow molecular weight distribution and a narrow composition distribution as well as a uniform molecular structure. Thus, copolymer compositions including the inventive copolymer (X) and shaped articles obtained from the compositions tend to achieve an excellent surface appearance.

(Cocatalysts)

For example, the ethylene copolymer (X) of the invention may be synthesized using the above metallocene catalyst as a main catalyst and a boron compound and/or an organoaluminum compound such as a trialkylaluminum as a cocatalyst.

Examples of the boron compounds include trityltetrakis(pentafluorophenyl) borate, trimethylammoniumtetrakis(pentafluorophenyl) borate, di(hydrogenated tallow alkyl)

methylammoniumtetrakis(pentafluorophenyl) borate, triethylammoniumtetrakis(pentafluorophenyl) borate, tripropylammoniumtetrakis(pentafluorophenyl) borate, tri(n-butyl)ammoniumtetrakis(pentafluorophenyl) borate, tri(s-butyl)ammoniumtetrakis(pentafluorophenyl) borate, N,N-dimethylaniliniumtetrakis(pentafluorophenyl) borate, N,N-dimethylanilinium-n-butyltris(pentafluorophenyl) borate, N,N-dimethylaniliniumbenzyltris(pentafluorophenyl) borate, N,N-dimethylaniliniumtetrakis (4-(t-butyldimethylsilyl)-2,3,5,6-tetrafluorophenyl) borate, N,N-dimethylaniliniumtetrakis (4-(triisopropylsilyl)-2,3,5,6-tetrafluorophenyl) borate, N,N-dimethylaniliniumpentafluorophenoxytris (pentafluorophenyl) borate, N,N-diethylaniliniumtetrakis (pentafluorophenyl) borate, N,N-dimethyl-2,4,6-trimethylaniliniumtetrakis (pentafluorophenyl) borate, trimethylammoniumtetrakis(2,3,4,6-tetrafluorophenyl) borate, triethylammoniumtetrakis(2,3,4,6-tetrafluorophenyl) borate, tripropylammoniumtetrakis(2,3,4,6-tetrafluorophenyl) borate, N,N-dimethylaniliniumtetrakis(2,3,4,6-tetrafluorophenyl) borate, N,N-diethylaniliniumtetrakis(2,3,4,6-tetrafluorophenyl) borate and N,N-dimethyl-2,4,6-trimethylaniliniumtetrakis (2,3,4,6-tetrafluorophenyl) borate;

alkylammonium salts such as di(isopropyl)ammoniumtetrakis(pentafluorophenyl) borate, tri(n-butyl)ammoniumtetrakis(2,3,4,6-tetrafluorophenyl) borate, dimethyl(t-butyl)ammoniumtetrakis (2,3,4,6-tetrafluorophenyl) borate and dicyclohexylammoniumtetrakis(pentafluorophenyl) borate;

trisubstituted phosphonium salts such as triphenylphosphoniumtetrakis(pentafluorophenyl) borate, tri(o- tolyl)phosphoniumtetrakis(pentafluorophenyl) borate and tri(2,6-dimethylphenyl)phosphoniumtetrakis (pentafluorophenyl) borate;

disubstituted oxonium salts such as diphenyloxoniumtetrakis(pentafluorophenyl) borate, di(o-tolyl)oxoniumtetrakis (pentafluorophenyl) borate and di(2,6-dimethylphenyl)oxoniumtetrakis(pentafluorophenyl) borate; and disubstituted sulfonium salts such as diphenylsulfoniumtetrakis(pentafluorophenyl) borate, di(o-tolyl)sulfoniumtetrakis(pentafluorophenyl) borate and bis(2,6-dimethylphenyl)sulfoniumtetrakis (pentafluorophenyl) borate.

Examples of the organoaluminum compounds include trialkylaluminums such as trimethylaluminum, triethylaluminum, triisobutylaluminum and tri-n-octylaluminum, tricycloalkylaluminums, isobutylaluminum dichloride, diethylaluminum chloride, ethylaluminum dichloride, ethylaluminum sesquichloride, methylaluminum dichloride, dimethylaluminum chloride, diisobutylaluminum hydride, LiAl $(C_2H_5)_4$, LiAl$(C_7H_{15})_4$, and organoaluminumoxy compounds.

The organoaluminumoxy compounds may be conventionally known aluminoxanes or may be benzene-insoluble organoaluminumoxy compounds such as those described in JP-A-H02-78687.

⟨Polymerization Conditions⟩

The reaction temperature in the synthesis of the inventive ethylene copolymer (X) is usually −20 to 200° C., and preferably 0 to 150° C. The polymerization pressure is usually from above 0 MPa to not more than 8 MPa (gauge pressure), and preferably from above 0 MPa to not more than 5 MPa (gauge pressure).

The reaction time (the average residence time in the case of continuous copolymerization) may vary depending on conditions such as the catalyst concentration and the polymerization temperature, but it is usually 0.5 minutes to 5 hours, and preferably 10 minutes to 3 hours. Further, molecular weight modifiers such as hydrogen may be used.

When the olefins are polymerized with use of the above metallocene catalysts, the transition metal compounds represented by General Formulae [I], [II] and [X] are usually used in $10^{-12}$ to $10^{-2}$ mol, and preferably $10^{-10}$ to $10^{-8}$ mol per 1 liter of the reaction volume.

The cocatalyst used in combination with the transition metal compound is usually used in a molar ratio of the cocatalyst to the total of transition metal atoms (M) in the transition metal compound [cocatalyst/M] of 0.1/1 to 1000/1, and preferably 1/1 to 500/1.

In the invention, the ethylene copolymer may be produced by any of liquid phase polymerization methods such as solution (dissolution) polymerization and suspension polymerization, or gas phase polymerization methods. Although the polymerization method is not particularly limited, it is preferable that the method include a step of obtaining a polymerization reaction liquid described below.

The step of obtaining a polymerization reaction liquid is a step in which the ethylene [A], the component [B], the at least one polyene and/or the cyclic olefin [C] and optionally other monomers are copolymerized in the presence of the metallocene catalyst and the cocatalyst using an aliphatic hydrocarbon as the polymerization solvent to form a polymerization reaction liquid containing a copolymer of the ethylene [A], the component [B], and the at least one polyene and/or the cyclic olefin [C] (and other monomers).

Examples of the polymerization solvents include aliphatic hydrocarbons and aromatic hydrocarbons. Specific examples include aliphatic hydrocarbons such as propane, butane, pentane, hexane, heptane, octane, decane, dodecane and kerosine, alicyclic hydrocarbons such as cyclopentane, cyclohexane and methylcyclopentane, aromatic hydrocarbons such as benzene, toluene and xylene, and halogenated hydrocarbons such as ethylene chloride, chlorobenzene and dichloromethane.

These may be used singly, or two or more kinds may be used in combination. The α-olefin itself subjected to polymerization may be used as the polymerization solvent.

Of the polymerization solvents described above, hexane is preferable from the viewpoints of separation and purification of the ethylene copolymer obtained.

The polymerization reaction may be carried out batchwise, semi-continuously or continuously. Further, the polymerization may be carried out in two or more stages under different reaction conditions.

For example, the polymerization reaction may be performed as described above and may be terminated by the addition of an acidic alcohol such as methanol to the reaction system.

The molecular weight of the ethylene polymer obtained by the polymerization reaction may be controlled by allowing hydrogen to be present in the polymerization system or by changing the polymerization temperature. In detail, reducing the amount of hydrogen in the polymerization system can increase the molecular weight of the obtainable ethylene copolymer and consequently results in an ethylene copolymer having an intrinsic viscosity in the inventive range. By maintaining the polymerization temperature at a moderate temperature and the catalytic activity at a high level, the molecular weight of the obtainable ethylene copolymer can be significantly increased, thereby achieving an intrinsic viscosity in the aforementioned range.

Further, the molecular weight of the ethylene copolymer can be adjusted by controlling the amount of the cocatalyst used.

[Ethylene Copolymer Compositions]

In the present invention, the term ethylene copolymer composition means a composition obtained by adding various known additives to the ethylene copolymer (X). In terms of shaping processability and flexibility, a composition including 100 to 1000 parts by mass of a plasticizer (Y) with respect to 100 parts by mass of the ethylene copolymer (X) is preferable. Needless to mention, the composition may contain any of various known additives other than plasticizers.

The ethylene copolymer composition of the invention preferably includes the plasticizer (Y) in an amount of not less than 130 parts by mass, more preferably not less than 150 parts by mass, still more preferably not less than 180 parts by mass, particularly preferably not less than 200 parts by mass, and most preferably not less than 250 parts by mass with respect to 100 parts by mass of the ethylene copolymer (X).

On the other hand, the upper limit of the plasticizer (Y) is preferably not more than 700 parts by mass, more preferably not more than 500 parts by mass, and particularly preferably not more than 400 parts by mass. In an embodiment, it is also preferable that the amount of the plasticizer be not less than 700 parts by mass, and preferably not less than 701 parts by mass.

As compared with conventional ethylene copolymer compositions, the inventive ethylene copolymer composition has a lower risk that the plasticizer (Y) will exudate from the composition even when the composition contains as much as 1000 parts by mass or less of the plasticizer (Y). Thus, the inventive compositions can be extended by large volumes of extender oils.

In terms of rubber elasticity in an uncrosslinked state, it is preferable that the ethylene copolymer composition of the invention have a loss tangent (tan δ) at 190° C. and 0.01 rad/sec of 0.1 to 1.0, and more preferably 0.3 to 1.0.

The ethylene copolymer composition of the invention preferably satisfies Equation [I] below:

$$\eta+\max > 10000 \times (\eta+@10\ s)^{0.47} \quad \text{Equation [I]}$$

(in the equation, $\eta+\max$ is the maximum viscosity reached in the measurement of extensional viscosity at 190° C. and 0.01 [1/s], and $\eta+@10\ s$ is the viscosity after 10 seconds after the start of the measurement).

The ethylene copolymer composition satisfying Equation [I] exhibits high viscosity when it is elongated in a molten state and thus achieves excellent calendering properties to allow for the calendering of thin, flat and smooth films.

In an example of the ethylene copolymer compositions of the invention, a crosslinking agent is added to the ethylene copolymer to give a copolymer composition, which is then shaped and crosslinked to produce desired rubber shaped articles.

In terms of shaping processability and flexibility, the ethylene copolymer of the invention is preferably used singly, namely, the inventive ethylene copolymer composition does not substantially contain any other polymer components. However, other polymer components may be contained while ensuring that characteristics are not deteriorated.

The ethylene copolymer composition of the invention containing various components described above is excellent in shaping processability and thus can be shaped into desired rubber shaped articles. Methods for crosslinking such rubber shaped articles according to the invention will be described later.

Specifically, the ethylene copolymer composition of the invention can be processed by roll kneading without sticking to the rolls or causing bugs even when the composition has been filled with significantly large amounts of additives, and the composition exhibits excellent handling properties during extrusion and molding and can be shaped easily.

The Mooney viscosity [ML (1+4) 125° C.)] of the ethylene copolymer composition measured at 125° C. in accordance with JIS K 6300 with a Mooney viscometer (SMV202 manufactured by Shimadzu Corporation) is usually 20 to 80, and preferably 25 to 70.

The term "polymer components" indicates compounds obtained by reacting monomers having polymerizable functional groups (for example, combinations of ethylenically unsaturated bonds, carboxyl groups and amino groups).

Next, the phrase "does not substantially contain" means that in the ethylene copolymer composition of the invention, the content of polymer components other than the inventive ethylene copolymer is not more than 1 mass % in 100 mass % of the composition.

Examples of the crosslinking agents include vulcanizing agents, vulcanization accelerators and vulcanization aids.

⟨Vulcanizing Agents⟩

Examples of the vulcanizing agents include sulfur compounds, organic peroxides, phenolic resins and oxime compounds.

Preferred examples of the sulfur compounds include sulfur, sulfur chloride, sulfur dichloride, morpholine disulfide, alkylphenol disulfide, tetramethylthiuram disulfide and selenium dithiocarbamate. Of these, for example, sulfur and tetramethylthiuram disulfide are more preferred.

The amount of the sulfur compounds added is usually 0.1 to 10 parts by mass with respect to 100 parts by mass of the inventive ethylene copolymer (X). This amount advantageously ensures that the obtainable crosslinked products show excellent mechanical properties.

Preferred examples of the organic peroxides include dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butylperoxy-3,3,5-trimethylcyclohexane and di-t-butyl hydroperoxide. Of these, for example, dicumyl peroxide, di-t-butyl peroxide and di-t-butylperoxy-3,3,5-trimethylcyclohexane are more preferred.

The amount of the organic peroxides added is usually 0.001 to 0.05 mol with respect to 100 g of the inventive ethylene copolymer (X). This amount of the organic peroxides added advantageously ensures that the obtainable crosslinked products show excellent mechanical properties.

The vulcanizing agents described above may be used singly, or two or more kinds may be used in combination.

⟨Vulcanization Accelerators⟩

When the sulfur compounds are used as the vulcanizing agents, vulcanization accelerators are preferably used in combination therewith.

Examples of the vulcanization accelerators include thiazole compounds such as N-cyclohexylbenzothiazole-2-sulphenamide (for example: "Sanceler CM" (product name, manufactured by SANSHIN CHEMICAL INDUSTRY CO., LTD.)), N-oxydiethylene-2-benzothiazole sulphenamide, N,N'-diisopropyl-2-benzothiazole sulphenamide, 2-mercaptobenzothiazole (for example: "Sanceler M" (product name, manufactured by SANSHIN CHEMICAL INDUSTRY CO., LTD.)), 2-(4-morpholinodithio)benzothiazole (for example: "Nocceler MDB-P" (product name, manufactured by SANSHIN CHEMICAL INDUSTRY CO., LTD.)), 2-(2,4-dinitrophenyl)mercaptobenzothiazole, 2-(2,6-diethyl-4-morpholinothio)benzothiazole, dibenzothiazyl disulfide, and cyclohexylamine salt of 2-mercaptobenzothiazole (for example: "Sanceler HM" (product name, manufactured by SANSHIN CHEMICAL INDUSTRY CO., LTD.));

guanidine compounds such as diphenylguanidine, triphenylguanidine and diorthotolylguanidine; aldehyde amine compounds such as acetaldehyde-aniline condensate and butylaldehyde-aniline condensate; imidazoline compounds such as 2-mercaptoimidazoline; thiourea compounds such as diethylthiourea and dibutylthiourea;

thiuram compounds such as tetramethylthiurammonosulfide (for example: "Nocceler TS" (product name, manufactured by OUCHI SHINKO CHEMICAL INDUSTRIAL CO., LTD.)), tetramethylthiuram disulfide (for example: "Sanceler TT" (product name, manufactured by SANSHIN CHEMICAL INDUSTRY CO., LTD.)), tetraethylthiuram disulfide (for example: "Sanceler TET" (product name, manufactured by SANSHIN CHEMICAL INDUSTRY CO., LTD.)), dipentamethylenethiuram tetrasulfide (for example: "Sanceler TRA" (product name, manufactured by SANSHIN CHEMICAL INDUSTRY CO., LTD.)), and tetrakis(2-ethylhexyl) thiuram disulfide (for example: "Nocceler TOT" (product name, manufactured by OUCHI SHINKO CHEMICAL INDUSTRIAL CO., LTD.));

dithioate salt compounds such as zinc dimethyldithiocarbamate (for example: "Sanceler PZ" (product name, manufactured by SANSHIN CHEMICAL INDUSTRY CO., LTD.)), zinc diethyldithiocarbamate, zinc dibutyldithiocarbamate (for example: "Sanceler BZ" (product name, manufactured by SANSHIN CHEMICAL INDUSTRY CO., LTD.)), tellurium diethyldithiocarbamate (for example: "Sanceler TE" (product name, manufactured by SANSHIN CHEMICAL INDUSTRY CO., LTD.)), and zinc dibenzyldithiocarbamate (for example: "Nocceler ZTC" (product name, manufactured by OUCHI SHINKO CHEMICAL INDUSTRIAL CO., LTD.));

thiourea compounds such as ethylenethiourea (for example: "Sanceler 22-C" (product name, manufactured by SANSHIN CHEMICAL INDUSTRY CO., LTD.)) and N,N'-diethylthiourea (for example: "Sanceler BUR" (product name, manufactured by SANSHIN CHEMICAL INDUSTRY CO., LTD.)); xanthate compounds such as zinc dibutylxanthate; and others such as Chinese white (for example, META-Z102 (product name, manufactured by Inoue Calcium Corporation, zinc oxide)).

The amount of the vulcanization accelerators added is usually 0.1 to 20 parts by mass with respect to 100 parts by mass of the inventive ethylene copolymer (X). The vulcanization accelerators may be used singly, or two or more kinds may be used in combination.

The amounts of the vulcanizing agents and the vulcanization accelerators in the above ranges advantageously ensure that the obtainable crosslinked products show excellent mechanical properties.

⟨Vulcanization Aids⟩

Examples of the vulcanization aids as examples of the crosslinking agents include quinone dioxime vulcanization aids such as p-quinone dioxime; acrylic vulcanization aids such as ethylene glycol dimethacrylate and trimethylolpropane trimethacrylate; allyl vulcanization aids such as diallyl phthalate and triallyl isocyanurate (for example, M-60 (product name, manufactured by Nippon Kasei Chemical Co., Ltd.)); other maleimide vulcanization aids; divinylbenzene; zinc oxide, and magnesium oxide/Chinese white (for example, META-Z102 (product name, manufactured by Inoue Calcium Corporation, zinc oxide)). Appropriate vulcanization aids may be selected in accordance with purposes.

The vulcanization aids may be used singly, or two or more kinds may be used in combination.

The amount of the vulcanization aids added is usually 1 to 50 parts by mass with respect to 100 parts by mass of the inventive ethylene copolymer (X).

The ethylene copolymer composition of the invention may contain other components as required in addition to the inventive copolymer (X) and the crosslinking agents.

⟨Plasticizers (Y)⟩

Examples of the plasticizers (Y) in the invention include petroleum plasticizers such as process oils (for example, Diana Process Oil PW-380, Diana Process Oil PW-100 (product name, manufactured by Idemitsu Kosan Co., Ltd.) and Diana Process Oil PS-430 (product name, manufactured by Idemitsu Kosan Co., Ltd.)), lubricating oils, paraffin oils, liquid paraffins, petroleum asphalts and vaselines; coal tar plasticizers such as coal tars and coal tar pitches; fatty oil plasticizers such as castor oil, linseed oil, rapeseed oil, soybean oil and coconut oil; waxes such as bees wax, carnauba wax and lanolin; fatty acids and salts thereof such as ricinoleic acid, palmitic acid, stearic acid, barium stearate, calcium stearate and zinc laurate; naphthenic acid, pine oil, rosin and derivatives thereof; synthetic polymer substances such as terpene resins, petroleum resins, atactic polypropylenes and coumarone indene resins; ester plasticizers such as dioctyl phthalate, dioctyl adipate and dioctyl sebacate; and others such as microcrystalline waxes, liquid polybutadienes, modified liquid polybutadienes, liquid thiokols, hydrocarbon-based synthetic lubricating oils, tall oils and rubber substitutes (factices).

Of these, petroleum plasticizers are particularly preferable. The plasticizers (Y) in the invention may be used singly, or two or more kinds may be used in combination.

In the case where rubber shaped articles obtained from the inventive ethylene copolymer composition are used in automobile part applications, it is preferable that the use of the petroleum plasticizers be minimally suppressed in order to avoid extraction of oils.

⟨Other Components⟩

Examples of other components include foaming agents, foaming aids, reinforcing agents, inorganic fillers, anti-aging agents (stabilizers), processing aids, activating agents and moisture absorbers. These components may be added to the composition in accordance with, for example, the applications and purposes of the inventive copolymer composition.

Examples of the foaming agents include inorganic foaming agents such as sodium bicarbonate and sodium carbonate; and organic foaming agents, including nitroso compounds such as N,N'-dinitrosopentamethylenetetramine and N,N'-dinitrosoterephthalamide; azo compounds such as azodicarbonamide and azobisisobutyronitrile; hydrazide compounds such as benzenesulfonylhydrazide and 4,4'-oxybis(benzenesulfonylhydrazide); and azide compounds such as calcium azide and 4,4'-diphenyldisulfonyl azide.

Examples of commercially available such products include VINYFOR AC-2F (product name, manufactured by EIWA CHEMICAL IND. CO., LTD.), VINYFOR AC#LQ (product name, manufactured by EIWA CHEMICAL IND. CO., LTD., azodicarbonamide (abbreviated to ADCA)), NEOCELLBORN N#1000SW (product name, manufactured by EIWA CHEMICAL IND. CO., LTD., 4,4'-oxybis(benzenesulfonylhydrazide (abbreviated to OBSH)) and CELLULAR D (product name, manufactured by EIWA CHEMICAL IND. CO., LTD., N,N'-dinitrosopentamethylenetetramine (abbreviated to DPT)).

The amount of the foaming agents added is usually 1 to 70 parts by mass with respect to 100 parts by mass of the inventive ethylene copolymer (X).

The foaming aids have effects such as lowering the decomposition temperature or facilitating the decomposition of the foaming agent, and making cells uniform. Examples of the foaming aids include organic acids and salts thereof such as salicylic acid, phthalic acid, stearic acid, oxalic acid and citric acid; urea and derivatives thereof.

Examples of commercially available such products include CELLPASTE K5 (product name, manufactured by EIWA CHEMICAL IND. CO., LTD., urea) and FE-507 (product name, manufactured by EIWA CHEMICAL IND. CO., LTD., sodium bicarbonate).

The amount of the foaming aids added is usually 0.1 to 5 parts by mass with respect to 100 parts by mass of the inventive ethylene copolymer (X).

In order to improve the mechanical properties of rubber shaped articles obtained from the composition such as tensile strength, tear strength and abrasion resistance, reinforcing agents or inorganic fillers may be added to the ethylene copolymer composition of the invention.

Examples of the reinforcing agents include ASAHI #55G, ASAHI #50HG and ASAHI #60G (product names, manufactured by ASAHI CARBON CO., LTD.) and carbon black SEAST series (such as SRF, GPF, FEF, MAF, HAF, ISAF, SAF, FT and MT) (manufactured by Tokai Carbon Co., Ltd.); products obtained by surface-treating these carbon blacks with agents such as silane-coupling agents; silica; activated calcium carbonate; finely powdered talc and finely powdered silicic acid.

Of these, preferred agents include ASAHI #55G, ASAHI #50HG, ASAHI #60G and SEAST FEF.

Examples of the inorganic fillers include light calcium carbonates, heavy calcium carbonates, talcs and clays, with talcs being particularly preferable. Examples of the talcs include commercially available MISTRON VAPOR (manufactured by NIHON MISTRON CO., LTD.).

The amount of the reinforcing agents or the inorganic fillers added is usually 150 to 800 parts by mass with respect to 100 parts by mass of the inventive ethylene copolymer (X).

When the amount of the reinforcing agents or the inorganic fillers added is in the above range, the ethylene copolymer composition of the invention exhibits excellent kneading processability and gives rubber shaped articles (crosslinked shaped articles) excellent in mechanical properties such as strength and flexibility as well as in permanent compression set.

Similarly to usual rubber compositions, the ethylene copolymer composition of the invention may be extended in product life by the use of anti-aging agents.

Examples of the anti-aging agents include known anti-aging agents such as amine anti-aging agents, phenolic anti-aging agents and sulfur anti-aging agents. Specific examples include aromatic secondary amine anti-aging agents such as phenylbutylamine and N,N'-di-2-naphthyl-p-phenylenediamine; phenolic anti-aging agents such as dibutylhydroxytoluene and tetrakis[methylene(3,5-di-t-butyl-4-hydroxy)hydrocinnamato]methane; thioether anti-aging agents such as bis[2-methyl-4-(3-n-alkylthiopropionyloxy)-5-t-butylphenyl]sulfide; dithiocarbamate salt anti-aging agents such as nickel dibutyldithiocarbamate; zinc salts of 2-mercaptobenzoylimidazole and 2-mercaptobenzimidazole; and sulfur anti-aging agents such as dilauryl thiodipropionate and distearyl thiodipropionate. These anti-aging agents may be used singly, or two or more kinds may be used in combination.

The amount of the anti-aging agents added is usually 0.3 to 10 parts by mass with respect to 100 parts by mass of the inventive ethylene copolymer (X). This amount of the anti-aging agents added advantageously ensures that the obtainable ethylene copolymer composition is free from blooming on the surface as well as that vulcanization is not inhibited.

The processing aids may be any of processing aids generally added to rubbers. Specific examples include ricinolic acid, palmitic acid, lauric acid, stearic acid, stearate esters, barium stearate, zinc stearate and calcium stearate, with stearic acid being preferable.

The amount of the processing aids added is usually 10 parts by mass or less with respect to 100 parts by mass of the inventive ethylene copolymer (X). This amount of the processing aids added advantageously ensures that the obtainable ethylene copolymer composition is free from blooming on the surface as well as that vulcanization is not inhibited.

Examples of the activating agents include amines such as di-n-butylamine, dicyclohexylamine, monoethanolamine, Acting B (product name, manufactured by Yoshitomi Seiyaku K.K.) and Acting SL (product name, manufactured by Yoshitomi Seiyaku K.K.);

activators such as diethylene glycol, polyethylene glycol (for example, PEG #4000 (product name, manufactured by Lion Corporation)), lecithin, triallyl trimellitate and zinc compounds of aliphatic and aromatic carboxylic acids (for example, Struktol activator 73, Struktol IB 531 and Struktol FA 541 (product names, manufactured by Scill & Seilacher)); zinc peroxide masterbatches such as ZEONET ZP (product name, manufactured by ZEON CORPORATION); octadecyltrimethylammonium bromide; synthetic hydrotalcite; and special quaternary ammonium compounds (for example, Arquad 2HT-F (product name, manufactured by LION AKZO Co., Ltd.)).

Of these, polyethylene glycol (for example, PEG #4000 (product name, manufactured by Lion Corporation)) and Arquad 2HT-F are preferable.

These activating agents may be used singly, or two or more kinds may be used in combination.

The amount of the activating agents added is usually 0.2 to 10 parts by mass with respect to 100 parts by mass of the inventive ethylene copolymer (X).

Examples of the moisture absorbers include calcium oxide (for example, VESTA-18 (product name, manufactured by INOUE SEKKAI KOGYO K.K.), silica gel, sodium sulfate, molecular sieves, zeolites and white carbon. Of these, calcium oxide is preferable.

Appropriate moisture absorbers may be selected in accordance with purposes. The moisture absorbers may be used singly, or two or more kinds may be used in combination. The amount of the moisture absorbers added is usually 0.5 to 15 parts by mass with respect to 100 parts by mass of the inventive ethylene copolymer (X).

⟨Methods for Producing Ethylene Copolymer Compositions⟩

The ethylene copolymer compositions of the invention may be produced by any methods without limitation. Various known methods may be adopted in which the ethylene copolymer (X) is mixed together with the additives.

Exemplary production methods include a method in which the components for the ethylene copolymer composition are mixed together with, for example, a conventional kneading apparatus such as a mixer, a kneader or rolls and further with a continuous kneading apparatus such as a twin-screw extruder, and a method in which the components for the ethylene copolymer composition are dissolved or dispersed and the solvent is removed from the solution.

[Crosslinked Rubber Shaped Articles]

Crosslinked rubber shaped articles can be obtained by shaping and crosslinking the aforementioned inventive ethylene copolymer composition simultaneously (production method 1) or by shaping and thereafter crosslinking the composition (production method 2).

In the invention, the term "shaped articles" refers to shaped articles other than films or sheets with a thickness of not more than 1.5 mm.

In an example of the production method 1, the inventive ethylene copolymer composition is preliminarily shaped, while performing heating concurrently with the preliminary shaping, into a desired shape by any of various shaping methods which involve a heater such as a heating tank with a heating configuration such as extruder, press, injection molding apparatus, transfer molding apparatus, hot air, glass bead fluidized bed, UHF (ultra high frequency wave), steam or LCM (molten salt bath).

In this method, the aforementioned vulcanizing agent is used, optionally together with the vulcanization accelerator and/or the vulcanization aid. The heating conditions are generally 140 to 300° C., preferably 150 to 270° C. and usually 0.5 to 30 minutes, preferably 0.5 to 20 minutes. This heating induces a crosslinking reaction to allow the inventive ethylene copolymer to form a high-order network structure and thereby to give rubber shaped articles having high strength and excellent rubber elasticity.

The shaping and crosslinking of the inventive ethylene copolymer composition may be performed with or without a mold. Without a mold, the inventive copolymer composition is usually shaped and crosslinked continuously.

In an example of the production method 2, the ethylene copolymer composition is preliminarily shaped by the aforementioned shaping method and the shaped article is introduced and heated in a vulcanization tank or the shaped article is irradiated with electron beams.

When the shaped article is introduced and heated in a vulcanization tank, the heating conditions may be similar to those in the method in which the composition is heated concurrently with the preliminary shaping.

Next, in the method with the application of electron beams, the preliminarily shaped article may be irradiated with 0.1 to 10 MeV electron beams such that the absorbed dose will be, for example, 0.5 to 35 Mrad, and preferably 0.5 to 20 Mrad. In this manner, similarly as described above, a crosslinking reaction is induced which allows the inventive ethylene copolymer composition to form a crosslinked polymer and to give rubber shaped articles having high strength.

For example, the rubber shaped articles produced by the aforementioned methods may be used in various fields. In detail, the shaped articles may be suitably manufactured as products such as automobile parts, marine vessel parts, civil engineering and building parts, medical parts, electric and electronic appliance parts, transport machine parts, leisure goods, hoses (such as radiator hoses and heater hoses), vibration-proof rubbers, sheets, various belts, various packings, sealing materials, potting materials and coating materials.

Examples of the automobile parts include glass run channels, weather strip sponges, door opening trims, seal members, grommets, automobile engine gaskets, sealing materials for electrical components or oil filters; potting materials for igniter HICs or automobile hybrid ICs; coating materials for automobile bodies, automobile window glasses and engine control boards; gaskets for parts such as oil pans or timing belt covers, and adhesives for moles, head lamp lenses, sun roof seals and mirrors.

Examples of the weather strip sponges include door weatherstrips, trunk weatherstrips, luggage weatherstrips, roof side rail weatherstrips, slide door weatherstrips, ventilator weatherstrips, sliding roof weatherstrips, front window weatherstrips, rear window weatherstrips, quarter window weatherstrips, lock pillar weatherstrips, door glass outer weatherstrips and door glass inner weatherstrips.

Examples of the marine vessel parts include sealing materials for wire connection and branching boxes, electrical system parts or electric wires; and adhesives for electric wires or glasses.

Examples of the civil engineering and building parts include building sealants used for butt joints in a glass screen method for commercial buildings, joints of glass fringes and sashes, interior joints in toilet facilities, lavatories, show cases or the like, joints in bathtub circumferences, outer wall expansion joints in prefabrication houses, and joints of siding boards; sealing materials for double glasses; civil engineering sealants used in road repairing; coatings and adhesives for metals, glasses, stone materials, slates, concretes or tiles; and pressure-sensitive adhesive sheets, waterproof sheets or vibration-proof sheets.

Examples of the medical parts include medical rubber stoppers, syringe gaskets and rubber stoppers for pressure reduction vessels.

Examples of the electric and electronic appliance parts include sealing materials, potting materials, coating materials or adhesives for heavy electric machinery parts, light electric machinery parts, and circuits and boards for electric and electronic appliances; repairing materials for electric wire coatings; insulating sealing materials for electric wire joints; OA appliance rolls; vibration absorbing materials; grommets; or gels or capacitor sealing materials.

Examples of the transport machine parts include automobiles, marine vessels, airplanes and railway vehicles.

Examples of the leisure goods include swimming gears such as swimming caps, diving masks and earplugs; and gel buffering members for items such as sport shoes and baseball gloves.

Examples of the vibration-proof rubbers include automobile vibration-proof rubbers (engine mounts, liquid seal engine mounts, damper pulleys, chain dampers, carburetor mounts, torsional dampers, strut mounts, rubber bushes, bumper rubbers, helper rubbers, spring seats, shock absorbers, air springs, body mounts, bumper guards, muffler supports, rubber couplings, center bearing supports, clutch rubbers, deaf mounts, suspension bushes, slide bushes, cushion strut bars, stoppers, handle dampers, radiator supporters or muffler hangers), railway vibration-proof rubbers (slab mats, ballast mats or track mats) and industrial machinery vibration-proof rubbers (expansion joints, flexible joints, bushes and mounts).

Examples of the sheets include roofing sheets and waterproof sheets.

Examples of the various belts include transmission belts (V belts, flat belts, toothed belts and timing belts) and conveyor belts (light conveyor belts, cylindrical belts, rough top belts, flanged conveyor belts, U-type guided conveyor belts and V-type guided conveyor belts).

For example, the above sealing materials are suitably used as sealing materials for refrigerators, freezers, washing machines, gas meters, microwave ovens, steam irons and leakage breakers. The term sealing materials refers to materials which seal (encapsulate or tightly close) objects. In abroad sense, the sealing materials include materials which are used to obtain water or air tightness at joints or contacts in various industries such as machinery, electricity and chemistry.

For example, the potting materials are suitably used for the potting of transformer high-voltage circuits, printed boards, high voltage transformers with variable resistors, electrical insulating parts, semiconductive parts and conductive parts.

For example, the coating materials are suitably used for the coating of various circuit elements such as high voltage thick film resistors or hybrid ICs; HICs, electrical insulating parts; semiconductive parts; conductive parts; modules; printed circuits; ceramic boards; buffer materials for diodes, transistors or bonding wires; semiconductor elements; or optical fibers for optical communication.

In addition to the aforementioned articles, the rubber shaped articles of the invention may be suitably manufactured as automobile cup/seal materials (master cylinder piston cups, wheel cylinder piston cups, constant-velocity joint boots, pin boots, dust covers, piston seals, packings, O-rings, diaphragms, dam window shields, door mirror brackets, seal head lamps and seal cowl tops), industrial sealing materials (capacitor packings, O-rings and packings), foams (hose-protecting sponges, cushioning sponges, heat insulating sponges and insulation pipes), electric wire coverings, electric wire joints, electrical insulating parts, semiconductive rubber parts, OA appliance rolls (charged rolls, transfer rolls, development rolls and paper feed rolls), industrial rolls (iron-making rolls, paper-making rolls and printing electric wire rolls), anode caps, plug caps, ignition cables, lamp socket covers, terminal covers, wiper blades, various tubes (vacuum tubes and tire tubes), air springs, shoe soles, shoe heels, tire side walls and fabric coatings.

[Films or Sheets]

In a preferred embodiment, films or sheets (hereinafter, sometimes collectively referred to as films) that include the inventive ethylene copolymer (X) contain the ethylene copolymer (X) as the principal resin component.

The films of the invention may contain resins other than the copolymer (X) as long as their performance is not deteriorated. Specific examples of such resins include LDPE and LLDPE.

The thickness of the inventive films may be determined in accordance with applications, but is usually in the range of 10 to 1500 µm, and preferably 20 to 1500 µm.

The films of the invention may contain a plasticizer (Y) in the range of 100 to 1000 parts by mass, preferably 130 to 700 parts by mass, and more preferably 150 to 500 parts by mass with respect to 100 parts by mass of the ethylene copolymer (X).

By containing the plasticizer (Y) in the above amount, the obtainable films become advantageously softened to exhibit flexibility (low hardness) and high stretchability. Further, such films can be calendered as will be described later.

The plasticizers (Y) in the invention may be selected appropriately in accordance with purposes. A single plasticizer or a mixture of two or more kinds of plasticizers may be used. Examples of the plasticizers include petroleum plasticizers such as process oils (for example: "Diana Process Oil PW-380" (product name, manufactured by Idemitsu Kosan Co., Ltd.), "Diana Process Oil PW-100" (product name, manufactured by Idemitsu Kosan Co., Ltd.) and "Diana Process Oil PS-430" (product name, manufactured by Idemitsu Kosan Co., Ltd.)), lubricating oils, paraffin oils, liquid paraffins, petroleum asphalts and vaselines; coal tar plasticizers such as coal tars and coal tar pitches; fatty oil plasticizers such as castor oil, linseed oil, rapeseed oil, soybean oil and coconut oil; waxes such as bees wax, carnauba wax and lanolin; fatty acids and salts thereof such as ricinoleic acid, palmitic acid, stearic acid, barium stearate, calcium stearate and zinc laurate; naphthenic acid, pine oil, rosin and derivatives thereof; synthetic polymer substances such as terpene resins, petroleum resins and coumarone indene resins; ester plasticizers such as dioctyl phthalate, dioctyl adipate and dioctyl sebacate; and others such as microcrystalline waxes, liquid thiokols, hydrocarbon-based synthetic lubricating oils, tall oils and rubber substitutes (factices). Of these, petroleum plasticizers are preferable, and process oils are particularly preferable.

In terms of flexibility and stretchability, the hardness (the durometer type A hardness measured by a method specified in JIS K 6253) of the inventive films or sheets is preferably in the range of 10 to 80, and more preferably 10 to 60.

Further, the films or sheets of the invention have sufficient strength and high elongation.

The ethylene copolymer (X) contained in the inventive film or sheet may be partially crosslinked. Crosslinking produces an effect that the residual strain after stretching is reduced.

Any crosslinking methods may be used without limitation. Exemplary methods include a method using crosslinking agents such as sulfur and peroxides, and a method in which electron beams are applied. Any electron beams may be used without limitation as long as the electron beams can cause the ethylene copolymer (X) to be crosslinked.

In general, the crosslinking is performed in such a manner that the films formed are irradiated with electron beams in the range of 10 to 200 kGy. The dose of the electron beams is adjusted in accordance with the applications of the films. In general, the degree of crosslinking tends to be increased with increasing dose.

Films formed by shaping an ethylene copolymer with an intrinsic viscosity [η] of less than 7.8 dl/g usually tend to be oriented in the machine direction (MD) when the molten films are drawn. Thus, such films or sheets tend to exhibit higher strength in the machine direction (MD) than in the transverse direction (TD) perpendicular thereto.

In contrast, the films or sheets formed from the inventive ethylene copolymer (X) tend to show higher strength in the TD than in the MD.

Although the reason for this is unclear, it is probable that the mechanism by which the films or sheets formed from the inventive ethylene copolymer (X) exhibit high strength be mainly ascribed to the difference of entanglement strength of polymer molecules. In this case, it is considered that the polymer molecules are disentangled by stretching and consequently the number of interlocks becomes smaller in the MD as compared with the TD of the films, and the consequent strength-lowering effect surpasses the strength-increasing effect by the crystallization of the polymer by stretching. This is probably the reason why the strength in the TD becomes higher than in the MD.

While in a preferred embodiment the inventive ethylene polymer (X) is produced with use of the aforementioned metallocene catalyst, such a polymer tends to have a lower value B than polymers obtained using conventional Ziegler catalysts. This fact indicates that the polymer has high block characteristics. Provided that polymers are amorphous, it is generally reasonable to think that a polymer with a lower value B has higher compatibility with oils (in particular, paraffin oils). Thus, it is assumed that as compared with Ziegler-catalyzed polymers, the polymers catalyzed by the aforementioned metallocene catalysts have more uniform entanglement, particularly in the TD, which is effective for the increase of strength in the TD, and consequently the difference in strength between the MD and the TD is further increased.

Preferably, the films or sheets formed from the inventive ethylene copolymer (X) have a STD/SMD ratio of not less than 1.1, and preferably not less than 1.5 wherein STD is the tensile break strength in the TD and SMD is the tensile break strength in the MD obtained by carrying out a tensile test (JIS K 6251) described later. Although the upper limit is not particularly limited, the ratio is usually not more than 3.0.

The films or sheets formed from the inventive ethylene copolymer (X) usually have a thickness of about 100 μm to 1000 μm; and the strength thereof is usually 2 MPa to 15 MPa in an uncrosslinked state and is usually 2 MPa to 15 MPa after crosslinked. However, these properties are not limited to the above ranges.

The films or sheets formed from the inventive ethylene copolymer (X) have excellent stretchability, particularly in the transverse direction, and thus achieve excellent application properties. For example, usual films or sheets are easily broken by being stretched in the transverse direction when they are used to wrap objects larger than the width of the films or sheets. Because of this, wrapping frequently entails the application two times. The films or sheets formed from the inventive ethylene copolymer (X) are resistant to cutting or breakage even when they are applied to wrap objects while being stretched in the transverse direction. Thus, wrapping can be completed in one application.

[Film Production Methods]

The films of the invention may be formed by various known production methods, for example, by melt extrusion methods (T-die methods and blown-film extrusion methods), solution methods (solution casting methods and wet casting methods) and calendering methods. In particular, calendering methods are preferable from the viewpoint of productivity.

[Applications of Films]

The films of the invention may be used in applications where conventional films such as vinyl chloride films and silicon films have been utilized.

EXAMPLES

Next, the present invention will be described in further detail by presenting examples without limiting the scope of the invention.

Properties of ethylene copolymers obtained in examples and comparative examples were measured in accordance with the following methods.

[Molar Amount of Structural Units Derived from Ethylene [A]]

The amount was determined by measuring the intensity with a $^1$H-NMR spectrometer.

[Molar Amount of Structural Units Derived from Non-Conjugated Polyene [C]]

The amount was determined by measuring the intensity with a $^1$H-NMR spectrometer.

[Intrinsic Viscosity [η]: dl/g]

The intrinsic viscosity [η] was measured at temperature: 135° C. in measurement solvent: decalin using a fully automatic intrinsic viscometer manufactured by RIGO CO., LTD.

[Loss Tangent (Tan δ)]

The loss tangent (tan δ) was measured using a viscoelasticity tester (model: ARES) manufactured by TA Instruments. In detail, a 25 mm in diameter×2 mm in thickness disk-shaped specimen sampled from a 2 mm thick sheet obtained by pressing at 190° C. was tested under the following conditions. RSI Orchestrator (manufactured by TA Instruments) was used as the data processing software.

Geometry: parallel plate
Measurement temperature: −10° C.
Frequency: 1 Hz

Example 1

Ethylene Copolymer-1

In a 300-L volume polymerizer equipped with a stirring blade, a polymerization reaction was continuously carried out at 60° C. to produce a terpolymer including a component [A]: ethylene, a component [B]: propylene and a component [C]: 5-ethylidene-2-norbornene (ENB).

To the polymerizer were continuously fed hexane as a polymerization solvent (feed rate: 44 kg/h), ethylene at a feed rate of 4.5 kg/h, propylene at a feed rate of 2.9 kg/h, ENB at a feed rate of 0.55 kg/h, and hydrogen at 0.4 NL/h. While maintaining the polymerization pressure at 1.6 MPa, (t-butylamido)-dimethyl($\eta^5$-2-methyl-s-indacen-1-yl) silanetitanium (II) 1,3-pentadiene having a structure represented by aforementioned Formula (XI) was continuously fed as a main catalyst to the polymerizer at 0.04 mmol/h. Further, cocatalysts, namely, trityltetrakis(pentafluorophenyl) borate [$(C_6H_5)_3CB(C_6F_5)_4$] and triisobutylaluminum (hereinafter, also referred to as "TIBA") as an organoaluminum compound were continuously fed to the polymerizer at 0.21 mmol/h and 13 mmol/h, respectively.

In the above manner, a polymerization liquid was obtained which contained 2.1 mass % of a copolymer including ethylene, propylene and ENB. The main catalyst had been obtained by synthesis in accordance with a method described in WO 98/49212. The polymerization reaction was terminated by the addition of a small amount of methanol to the polymerization liquid withdrawn from the lower portion of the polymerizer. The polymer was separated from the solvent by steam stripping treatment and was thereafter dried at 80° C. and a reduced pressure for all day and night. The properties of the obtained ethylene copolymer-1 are described in Table 1.

Example 2

Ethylene Copolymer-2

Polymerization was performed under the same conditions as in Example 1, except that the feed rates for ethylene, propylene, ENB and hydrogen were changed. The properties of the obtained ethylene copolymer-2 are described in Table 1.

Example 3

Ethylene Copolymer-3

Polymerization was performed under the same conditions as in Example 1, except that the feed rates for ethylene, propylene, ENB and hydrogen were changed. The properties of the obtained ethylene copolymer-3 are described in Table 1.

Example 4

Ethylene Copolymer-4

Polymerization was performed under the same conditions as in Example 1, except that the feed rates for ethylene, propylene, ENB and hydrogen were changed. The properties of the obtained ethylene copolymer-4 are described in Table 1.

Comparative Example 1

Ethylene Copolymer-5

Polymerization was performed under the same conditions as in Example 1, except that the feed rates for ethylene, propylene, ENB and hydrogen were changed. The properties of the obtained ethylene copolymer-5 are described in Table 1.

Comparative Example 2

Ethylene Copolymer-6

Polymerization was performed under the same conditions as in Example 1, except that the feed rates for ethylene, propylene, ENB and hydrogen were changed. The properties of the obtained ethylene copolymer-6 are described in Table 1.

Comparative Example 3

EP98 (product name, manufactured by JSR Corporation, amount of extender oil: 75 parts by mass) was subjected to Soxhlet extraction using boiling methyl ethyl ketone (MEK). The residue was obtained as an ethylene·propylene·5-ethylidene-2-norbornene terpolymer (three-component polymer). The properties of the obtained copolymer are described in Table 1.

Comparative Example 4

Ethylene Copolymer-7

[Production Example of ethylene·propylene·5-ethylidene-2-norbornene (ENB)]

Ethylene, propylene and 5-ethylidene-2-norbornene (ENB) were continuously copolymerized in a 15-L volume polymerizer equipped with a stirring blade. From the upper portion of the polymerizer, hexane as a polymerization solvent was continuously fed at a rate of 5 L per hour. On the other hand, the polymerization liquid was continuously withdrawn from the lower portion of the polymerizer such that the volume of the polymerization liquid in the polymerizer was constantly 5 L. The catalysts used were $VOCl_3$ and $Al(C_2H_5)_{1.5}Cl_{1.5}$. In detail, $VOCl_3$ and $Al(C_2H_5)_{1.5}Cl_{1.5}$ were continuously fed to the polymerizer such that the vanadium atom concentration and the aluminum atom concentration in the polymerizer would be 0.55 mmol/L and 3.3 mmol/L, respectively.

Ethylene and propylene monomers were continuously fed at rates of 200 L/h and 60 L/h, respectively. Further, ENB was continuously fed such that its concentration in the polymerizer would be 4 g/L. Hydrogen was used as a molecular weight modifier and was fed such that the hydrogen concentration in the gas phase in the polymerizer would be 5 mol %. The copolymerization reaction was performed at a temperature of 40° C. while circulating cooling water through a jacket on the exterior of the polymerizer.

The copolymerization reaction under the above conditions afforded a uniform solution of an ethylene·propylene·ENB copolymer. The polymerization reaction was terminated by the addition of a small amount of methanol to the polymerization liquid withdrawn from the lower portion of the polymerizer. The polymer was separated from the solvent by steam stripping treatment and was thereafter dried at 80° C. and a reduced pressure for all day and night. Through the above procedures, the ethylene·propylene·ENB copolymer was obtained at a rate of 265 g per hour.

The obtained ethylene copolymer-7 had an ethylene/propylene molar ratio of 77/23, an intrinsic viscosity [η] of 4.5 dl/g, and an ENB content of 1.3 mol %. The properties of the obtained copolymer are described in Table 1.

TABLE 1

| | | Properties of copolymers | | | | |
|---|---|---|---|---|---|---|
| | | Ethylene [mol %] | ENB [mol %] | Intrinsic viscosity [η] [dl/g] | Value B | tan δ (−10° C., 1 Hz) |
| Ex. 1 | Ethylene copolymer-1 | 78.5 | 1.17 | 8.6 | — | — |
| Ex. 2 | Ethylene copolymer-2 | 79.2 | 1.19 | 9.7 | — | — |
| Ex. 3 | Ethylene copolymer-3 | 69.5 | 1.09 | 11.3 | — | — |
| Ex. 4 | Ethylene copolymer-4 | 79.7 | 1.3 | 9.43 | 1.0 | 0.09 |
| Comp. Ex. 1 | Ethylene copolymer-5 | 73.1 | 1.22 | 7.45 | — | — |
| Comp. Ex. 2 | Ethylene copolymer-6 | 76.5 | 1.23 | 4.15 | — | — |
| Comp. Ex. 3 | Terpolymer | 75.9 | 1.16 | 4.45 | — | — |
| Comp. Ex. 4 | Ethylene copolymer-7 | 76.4 | 1.3 | 4.5 | 1.1 | 0.08 |

The permanent compression set of ethylene copolymers obtained in Comparative Example 5 and Reference Example 1 described below was measured in accordance with the following method.

[Permanent Compression Set]

Specimens for the measurement of permanent compression set were prepared as follows.

With a 1.7 L Banbury mixer, there were kneaded 220 parts by mass of an ethylene copolymer composition (ethylene copolymer: 100 parts by mass, plasticizer: 120 parts by mass), 5 parts by mass of Chinese white No. 3 as a vulcanization aid, 1 part by mass of stearic acid as a processing aid, 1 part by mass of "PEG #4000" (product name, polyethylene glycol, manufactured by Lion Corporation) as an activating agent, 50 parts by mass of carbon black: "ASAHI #50G" (product name, manufactured by ASAHI CARBON CO., LTD.) as a reinforcing agent, 40 parts by mass of calcium bicarbonate: "WHITON SB" (product name, manufactured by SHIRAISHI CALCIUM KAISHA, LTD.) and 30 parts by mass of surface-treated calcium carbonate "HAKUENKA CC" (product name, manufactured by SHIRAISHI CALCIUM KAISHA, LTD.) as inorganic fillers, and 50 parts by mass of "Diana Process Oil PW-380" (product name, manufactured by Idemitsu Kosan Co., Ltd.) as a plasticizer.

The resultant kneadate was supplied to 14-inch rolls (front roll temperature/rear roll temperature=50° C./50° C.) and was kneaded together with vulcanization accelerators: 2.0 parts by weight of "Sanceler BZ" manufactured by SANSHIN CHEMICAL INDUSTRY CO., LTD.: name of compound: zinc di-n-butyl·dithiocarbamate, 1.0 part by weight of "Sanceler M" manufactured by SANSHIN CHEMICAL INDUSTRY CO., LTD.: name of compound: 2-mercaptobenzothiazole, 0.5 parts by weight of "Sanceler TT" manufactured by SANSHIN CHEMICAL INDUSTRY CO., LTD.: name of compound: tetramethylthiuram disulfide, and 0.5 parts by weight of "Sanceler TRA" manufactured by SANSHIN CHEMICAL INDUSTRY CO., LTD.: name of compound: dipentamethylenethiuram tetrasulfide, and with 1.2 parts by weight of sulfur. Thus, a compounded rubber (a rubber composition) was obtained.

Next, the rubber composition was treated in accordance with JIS K 6250-8.5 (vulcanization at 170° C. for 15 minutes) into a vulcanized sample, and the permanent compression set after treatment at −10° C. for 22 hours was measured in accordance with JIS K 6262 (1997).

Comparative Example 5

Polymerization was performed under the same conditions as in Comparative Example 4, except that the feed rates for ethylene, propylene, ENB and hydrogen were changed. The properties of the obtained ethylene copolymer-7 are described in Table 2.

Reference Example 1

Polymerization was performed under the same conditions as in Example 1, except that the feed rates for ethylene, propylene, ENB and hydrogen were changed. The properties of the obtained ethylene copolymer-r are described in Table 2.

TABLE 2

|  | Comp. Ex. 5 | Ref. Ex. 1 |
|---|---|---|
| Ethylene copolymers | Ethylene copolymer-7 | Ethylene copolymer-r |
| Ethylene | 76.4 mol % | 75.9 mol % |
| ENB | 1.3 mol % | 1.24 mol % |
| Ethylene/propylene ratio | 77/23 | 77/23 |
| Value B | 1.1 | 1.0 |
| tan δ (−10° C., 1 Hz) | 0.08 | 0.08 |
| Intrinsic viscosity [η] dl/g | 4.5 | 4.86 |
| <Permanent compression set> | | |
| −10° C. × 22 h (%) | 60 | 52 |

[Ethylene Copolymer Compositions]

Properties of ethylene copolymer compositions obtained in examples and comparative examples were measured in accordance with the following methods.

[Loss Tangent (Tan δ)]

The loss tangent (tan δ) was measured using a viscoelasticity tester (model: ARES) manufactured by TA Instruments. In detail, a 25 mm in diameter×2 mm in thickness disk-shaped specimen sampled from a 2 mm thick sheet obtained by pressing at 190° C. was tested under the following conditions. RSI Orchestrator (manufactured by TA Instruments) was used as the data processing software.

Geometry: parallel plate
Measurement temperature: 190° C.
Frequency: 0.01 rad/sec
Strain: 1.0%

[Permanent Elongation]

A2 mm thick sheet obtained by pressing at 190° C. was used as a test specimen, which was held at room temperature (23° C.) under 100% elongation for 24 hours and was thereafter released. The permanent elongation was determined by measuring the residual strain after 1 hour.

Example 11

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-1 from Example 1 was kneaded together with 200 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 150° C.

The properties of the obtained ethylene copolymer composition are described in Table 3.

Example 12

An ethylene copolymer composition was obtained in the same manner as in Example 11, except that the ethylene copolymer-1 used in Example 11 was replaced by the ethylene copolymer-2 from Example 2.

The properties of the obtained ethylene copolymer composition are described in Table 3.

Example 13

An ethylene copolymer composition was obtained in the same manner as in Example 11, except that the ethylene copolymer-1 used in Example 11 was replaced by the ethylene copolymer-3 from Example 3.

The properties of the obtained ethylene copolymer composition are described in Table 3.

Comparative Example 11

An ethylene copolymer composition was obtained in the same manner as in Example 11, except that the ethylene copolymer-1 used in Example 11 was replaced by the ethylene copolymer-5 from Comparative Example 1.

The properties of the obtained ethylene copolymer composition are described in Table 3.

Comparative Example 12

An ethylene copolymer composition was obtained in the same manner as in Example 11, except that the ethylene copolymer-1 used in Example 11 was replaced by the ethylene copolymer-6 from Comparative Example 2.

The properties of the obtained ethylene copolymer composition are described in Table 3.

Comparative Example 13

With an MS pressure kneader (manufactured by MORIYAMA COMPANY LTD., DS3-10MWB-E, volume 3.0 L), 175 parts by mass of EP98 (ethylene copolymer: 100 parts by mass+extender oil: 75 parts by mass) described in Comparative Example 3 was kneaded together with 125 parts by mass of process oil: "PW-380" (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 142° C. The properties of the obtained ethylene copolymer composition are described in Table 3.

TABLE 3

| | Rubber properties of copolymer + paraffin oil (200 phr) compositions | |
|---|---|---|
| | tan δ (0.01 rad/s) at 190° C. | Permanent elongation at 23° C. (100% elongation) % |
| Ex. 11 | 0.88 | 7.7 |
| Ex. 12 | 0.58 | 6.1 |
| Ex. 13 | 0.51 | 5.3 |
| Comp. Ex. 11 | 1.82 | 25.5 |
| Comp. Ex. 12 | 3.20 | 38.1 |
| Comp. Ex. 13 | 2.68 | 40.8 |

Properties of ethylene copolymers and compositions thereof obtained in the following examples and comparative examples were measured in accordance with the aforementioned methods and also the following method.

[Extensional Viscosity]

The extensional viscosity was measured with a viscoelasticity tester (a rheometer (model: MCR301) manufactured by Anton Paar) equipped with a monoaxial extension jig (Sentmanat Extensional Rheometer).

The ethylene copolymer composition was pressed at 210° C. to form a 2 mm thick sheet, and the sheet was cut to give an extensional viscosity measurement specimen having a width of 10 mm and a length of 20 mm. The sample was subjected to extensional viscosity measurement at 190° C. and a strain rate of 0.01 $sec^{-1}$, thus measuring the maximum viscosity reached and the viscosity after 10 seconds after the start of the measurement.

Example 21

⟨Production of Ethylene Copolymer⟩

An ethylene copolymer-21 was obtained by polymerization under the same conditions as in Example 1, except that the feed rates for ethylene, propylene, ENB and hydrogen were changed. The properties of the obtained ethylene copolymer-21 are described in Table 4.

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-21 from Example 21 was kneaded together with 150 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/$cm^2$, the kneading time was 20 minutes, and the kneadate discharge temperature was 150° C.

The value of extensional viscosity of the obtained ethylene copolymer composition is described in Table 4.

Example 22

⟨Production of Ethylene Copolymer⟩

An ethylene copolymer-22 was obtained by polymerization under the same conditions as in Example 1, except that the feed rates for ethylene, propylene, ENB and hydrogen were changed. The properties of the obtained ethylene copolymer-22 are described in Table 4.

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-22 from Example 22 was kneaded together with 150 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/$cm^2$, the kneading time was 20 minutes, and the kneadate discharge temperature was 150° C.

The value of extensional viscosity of the obtained ethylene copolymer composition is described in Table 4.

Example 23

⟨Production of Ethylene Copolymer⟩

An ethylene copolymer-23 was obtained by polymerization under the same conditions as in Example 1, except that the feed rates for ethylene, propylene, ENB and hydrogen were changed. The properties of the obtained ethylene copolymer-23 are described in Table 4.

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-23 from Example 23 was kneaded together with 150 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/$cm^2$, the kneading time was 20 minutes, and the kneadate discharge temperature was 150° C.

The value of extensional viscosity of the obtained ethylene copolymer composition is described in Table 4.

Example 24

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-21 from Example 21 was kneaded together with 250 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/$cm^2$, the kneading time was 20 minutes, and the kneadate discharge temperature was 150° C.

The value of extensional viscosity of the obtained ethylene copolymer composition is described in Table 4.

Example 25

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-23 from Example 23 was kneaded together with 250 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/$cm^2$, the kneading time was 20 minutes, and the kneadate discharge temperature was 150° C.

The value of extensional viscosity of the obtained ethylene copolymer composition is described in Table 4.

Example 26

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-23 from Example 23 was kneaded together with 400 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 150° C.

The value of extensional viscosity of the obtained ethylene copolymer composition is described in Table 4.

Comparative Example 21

⟨Production of Ethylene Copolymer⟩

An ethylene copolymer-24 was obtained by polymerization under the same conditions as in Example 1, except that the feed rates for ethylene, propylene, ENB and hydrogen were changed. The properties of the obtained ethylene copolymer-24 are described in Table 4.

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-24 from Example 21 was kneaded together with 150 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 150° C.

The value of extensional viscosity of the obtained ethylene copolymer composition is described in Table 4.

Comparative Example 22

⟨Production of Ethylene Copolymer⟩

An ethylene copolymer-25 was obtained by polymerization under the same conditions as in Example 1, except that the feed rates for ethylene, propylene, ENB and hydrogen were changed. The properties of the obtained ethylene copolymer-25 are described in Table 4.

⟨Production of Ethylene Copolymer Composition⟩

With an MS pressure kneader (manufactured by MORIYAMA COMPANY LTD., DS3-10MWB-E, volume 3.0 L), 100 parts by mass of the ethylene copolymer-25 from Example 21 was kneaded together with 150 parts by mass of process oil "PW-380" (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 150° C.

The value of extensional viscosity of the obtained ethylene copolymer composition is described in Table 4.

[Table 4]

TABLE 4

|  |  | Ex. 21 | Ex. 22 | Ex. 23 | Ex. 24 | Ex. 25 | Ex. 26 | Comp. Ex. 21 | Comp. Ex. 22 |
|---|---|---|---|---|---|---|---|---|---|
| Ethylene copolymers |  | Copolymer-21 | Copolymer-22 | Copolymer-23 | Copolymer-21 | Copolymer-23 | Copolymer-23 | Copolymer-24 | Copolymer-25 |
| Ethylene content | mol % | 74.8 | 77.8 | 78.3 | 74.8 | 78.3 | 78.3 | 76.7 | 76.4 |
| ENB content | mol % | 1.1 | 1.2 | 1.3 | 1.1 | 1.3 | 1.3 | 1.7 | 1.3 |
| Intrinsic viscosity [η] | dl/g | 7.9 | 9.2 | 10.1 | 7.9 | 10.1 | 10.1 | 3.4 | 4.5 |
| Amount of extender oil | phr | 150 | 150 | 150 | 150 | 250 | 400 | 150 | 150 |
| η+ (10 s) | Pa·s | 7.22E+05 | 1.89E+06 | 1.74E+06 | 2.67E+05 | 6.19E+05 | 1.41E+05 | 3.52E+04 | 1.88E+05 |
| η+ max | Pa·s | 6.74E+06 | 1.13E+07 | 1.49E+07 | 3.68E+06 | 8.32E+06 | 4.91E+06 | 2.59E+05 | 1.93E+06 |
| 10000 × (η+ (10 s))^0.47 |  | 5.67E+06 | 8.91E+06 | 8.56E+06 | 3.55E+06 | 5.27E+06 | 2.63E+06 | 1.37E+06 | 3.01E+06 |

Properties of rubber compositions and crosslinked products obtained in the following examples and comparative examples were measured in accordance with the following methods.

[Properties of Rubber Compositions: Minimum Viscosity (Vm) and Scorch Time (t5, Min)]

Properties of rubber compositions were tested in accordance with JIS K 6300. In detail, changes in Mooney viscosity were measured at 125° C. using a Mooney viscometer (SMV202 manufactured by Shimadzu Corporation) and, from the start of the measurement, the minimum viscosity (Vm) was determined and further the time required for the viscosity to increase by 5 points from the minimum viscosity Vm was determined as the scorch time (t5, min).

[Evaluation of Rolling Processability of Compounds]

To evaluate rolling processability, first, an evaluation specimen (a rubber composition) was prepared in the following manner. With MIXTRON BB MIXER (manufactured by Kobe Steel, Ltd., BB-4 model, volume 2.95 L, rotor 4 WH), there were kneaded 300 parts by mass of an ethylene copolymer composition (a composition of any of Examples 4 to 6 and Comparative Examples 4 to 6) (ethylene copolymer: 100 parts by mass, plasticizer: 200 parts by mass), 5 parts by mass of zinc oxide: "META-Z102" (product name, manufactured by Inoue Calcium Corporation) as a vulcanization aid, 1 part by mass of stearic acid as a processing aid, 2 parts by mass of "PEG #4000" (product name, polyethylene glycol, manufactured by Lion Corporation) as an activating agent, 415 parts by mass of carbon black: "ASAHI #60G" (product name, manufactured by ASAHI CARBON CO., LTD.) as a reinforcing agent, 30 parts by mass of calcium bicarbonate: "WHITON SB" (product name, manufactured by SHIRAISHI CALCIUM KAISHA, LTD.) as an inorganic filler, and 150 parts by mass of "Diana Process Oil PW-380" (product name, manufactured by Idemitsu Kosan Co., Ltd.) as a plasticizer. The kneading conditions were such that the rotor rotational speed was 50 rpm, the floating weight pressure was 3 kg/cm$^2$, the kneading time was 5 minutes, and the kneadate discharge temperature was 145° C.

Next, the obtained rubber composition was wrapped around 6-inch open rolls and the rolling processability was evaluated. The rolling processability was evaluated based on the following two criteria.

◯: The composition exhibited good wrapping properties with respect to the rolls, and roll processing was carried out appropriately.

x: The roll processing treatment was difficult due to sagging or sticking of the compound.

[Hardness Test]

The hardness (type A durometer, HA) of rubber shaped articles was measured with respect to an approximately 12 mm thick stack which consisted of six sheets of 2 mm thick rubber shaped articles having flat surfaces, the sheets being stacked on top of one another via flat portions. Here, test pieces having contaminations, bubbles or scratches were rejected. The size of the measurement face of the test piece was such that the measurement could be performed while the tip of the probe was placed at a position at least 12 mm away from the end of the test piece.

[Tensile Test]

Rubber shaped articles (crosslinked products) were subjected to a tensile test at a measurement temperature of 23° C. and a stress rate of 500 mm/min in accordance with JIS K 6251 to determine the tensile strength at break (TB) and the elongation at break (EB).

[Permanent Compression Set]

A sample was collected from a vulcanized shaped article in accordance with JIS K 6250-6.5, and the permanent compression set after treatment at 70° C.×22 hours was measured in accordance with JIS K 6262 (1997).

Example 31

Production of Rubber Composition

Prior to crosslinking of rubber composition, there were kneaded, with the use of MIXTRON BB MIXER (manufactured by Kobe Steel, Ltd., BB-4 model, volume 2.95 L, rotor 4 WH), 300 parts by mass of an ethylene copolymer composition (the ethylene copolymer composition of Example 11) (ethylene copolymer-1: 100 parts by mass, plasticizer: 200 parts by mass), 5 parts by mass of zinc oxide: "META-Z102" (product name, manufactured by Inoue Calcium Corporation) as a vulcanization aid, 1 part by mass of stearic acid as a processing aid, 2 parts by mass of polyethylene glycol "PEG #4000" (product name, manufactured by Lion Corporation) as an activating agent, 415 parts by mass of carbon black "ASAHI #60G" (product name, manufactured by ASAHI CARBON CO., LTD.) as a reinforcing agent, 30 parts by mass of calcium bicarbonate: "WHITON SB" (product name, manufactured by SHIRAISHI CALCIUM KAISHA, LTD.) as an inorganic filler, and 150 parts by mass of "Diana Process Oil PW-380" (product name, manufactured by Idemitsu Kosan Co., Ltd.) as a plasticizer. The kneading conditions were such that the rotor rotational speed was 50 rpm, the floating weight pressure was 3 kg/cm², the kneading time was 5 minutes, and the kneadate discharge temperature was 145° C.

After the temperature of the blend was confirmed to become 40° C., the blend was supplied to 8-inch rolls and was kneaded together with 1.0 part by mass of "Sanceler M" (product name, manufactured by SANSHIN CHEMICAL INDUSTRY CO., LTD.) as a vulcanization accelerator, 1.0 part by mass of "Sanceler TT" (product name, manufactured by SANSHIN CHEMICAL INDUSTRY CO., LTD.) as a vulcanization accelerator, 1.5 parts by mass of "Sanceler Bz" (product name, manufactured by SANSHIN CHEMICAL INDUSTRY CO., LTD.) as a vulcanization accelerator, 1.5 parts by mass of "Sanceler 22" (product name, manufactured by SANSHIN CHEMICAL INDUSTRY CO., LTD.) as a vulcanization accelerator, 1.5 parts by mass of sulfur as a vulcanizing agent, and 5 parts by mass of "VESTA 18" (product name, manufactured by Inoue Calcium Corporation) as a moisture absorber. The kneading conditions for rolling were such that the roll temperatures were front roll/rear roll=50° C./50° C., the roll rotational speeds were front roll/rear roll=18 rpm/15 rpm, the roll gap was 3 mm, and the kneading time was 8 minutes.

⟨Production of Crosslinked Products⟩

The above blend was vulcanized with a press forming machine at 170° C. for 10 minutes to give a crosslinked product which was a 2 mm thick rubber sheet. Further, a rubber block for the testing of permanent compression set was prepared by vulcanization at 170° C. for 15 minutes.

The properties of the obtained rubber composition and the crosslinked products are described in Table 5.

Example 32

A rubber composition and crosslinked products were obtained in the same manner as in Example 31, except that the ethylene copolymer composition used in Example 31 was replaced by the ethylene copolymer composition from Example 12.

The properties of the obtained rubber composition and the crosslinked products are described in Table 5.

Example 33

A rubber composition and crosslinked products were obtained in the same manner as in Example 31, except that the ethylene copolymer composition used in Example 31 was replaced by the ethylene copolymer composition from Example 13.

The properties of the obtained rubber composition and the crosslinked products are described in Table 5.

Comparative Example 31

A rubber composition and crosslinked products were obtained in the same manner as in Example 31, except that the ethylene copolymer composition used in Example 31 was replaced by the ethylene copolymer composition from Comparative Example 11.

The properties of the obtained rubber composition and the crosslinked products are described in Table 5.

Comparative Example 32

A rubber composition and crosslinked products were obtained in the same manner as in Example 31, except that the ethylene copolymer composition used in Example 31 was replaced by the ethylene copolymer composition from Comparative Example 12.

The properties of the obtained rubber composition and the crosslinked products are described in Table 5.

Comparative Example 33

A rubber composition and crosslinked products were obtained in the same manner as in Example 31, except that the ethylene copolymer composition used in Example 31 was replaced by the ethylene copolymer composition from Comparative Example 13.

The properties of the obtained rubber composition and the crosslinked products are described in Table 5.

TABLE 5

| Compositions* | Ex. | | | Comp. Ex. | | |
|---|---|---|---|---|---|---|
| | 31 | 32 | 33 | 31 | 32 | 33 |
| Copolymers | | | | | | |
| Ethylene copolymer-1 | 300 | | | | | |
| Ethylene copolymer-2 | | 300 | | | | |
| Ethylene copolymer-3 | | | 300 | | | |
| Ethylene copolymer-5 | | | | 300 | | |
| Ethylene copolymer-6 | | | | | 300 | |
| Terpolymer | | | | | | 300 |
| Rolling processability evaluation results | ○ | ○ | ○ | x | x (Processing infeasible) | x (Processing infeasible) |
| (1) Properties of rubber compositions | | | | | | |
| Properties before vulcanization Vm | 29 | 33 | 36 | 16 | — | — |
| t5 (min) | 10.5 | 11.8 | 10.1 | 11.1 | — | — |
| (2) Properties of crosslinked products | | | | | | |
| Hardness (Shore-A) | 65 | 67 | 67 | 61 | — | — |
| Break elongation (%) | 300 | 350 | 330 | 190 | — | — |
| Break strength (MPa) | 7.2 | 8.5 | 8.9 | 3.4 | — | — |
| Permanent compression set (%) (70° C., 22 h) | 18 | 18 | 16 | 35 | — | — |

Properties of films or sheets formed from ethylene copolymer compositions of examples and comparative examples were measured in accordance with the following methods.

[Calendering Processability]

The ethylene copolymer composition weighing 150 g was wrapped around two rolls (6-inch rolls manufactured by NIPPO KOHKI K.K.) and was cut for 3 minutes at a roll temperature of 100° C., a guide width of 20 cm and a roll gap of 0.7 mm. Thereafter, the roll gap was set at 0.5 mm, and the composition was allowed to stand for 5 minutes and removed from the rolls.

The workability on the rolls, the shape of the bank during kneading, and the surface texture of formed sheet were evaluated based on the following criteria.

(1) Workability (processability) on rolls
○: Good (The cutting of the composition was feasible, and the composition was removed from the rolls easily.)
Δ: Relatively difficult (The releasability from the rolls was low, and the sheet collapsed.)
x: Difficult (The cutting was difficult, and the composition could not be removed in the form of sheet.)

(2) Shape of bank
○: The bank had a regular and uniform shape.
Δ: The shape became irregular at times.
x: The shape was irregular constantly and the normal bank was not formed.

(3) Surface texture of shaped articles
○: Excellent.
Δ: Relatively inferior.
x: Inferior (or the composition could not be removed in the form of sheet).

Example 41

With an MS pressure kneader (manufactured by MORIYAMA COMPANY LTD., DS3-10MWB-E, volume 3.0 L), 100 parts by mass of the ethylene copolymer-1 from Example 1 was kneaded together with 200 parts by mass of process oil: "PW-380" (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 150° C. The calendering processability of the obtained ethylene copolymer composition is described in Table 6.

Example 42

The procedures in Example 41 were repeated, except that the ethylene copolymer-1 used in Example 41 was replaced by the ethylene copolymer-2 from Example 2. The calendering processability of the obtained ethylene copolymer composition is described in Table 6.

Example 43

The procedures in Example 41 were repeated, except that the ethylene copolymer-1 used in Example 41 was replaced by the ethylene copolymer-3 from Example 3. The calendering processability of the obtained ethylene copolymer composition is described in Table 6.

Example 44

The procedures in Example 41 were repeated, except that the ethylene copolymer-1 used in Example 41 was replaced by the ethylene copolymer-4 from Example 4. The calendering processability of the obtained ethylene copolymer composition is described in Table 6.

Comparative Example 41

The procedures in Example 41 were repeated, except that the ethylene copolymer-1 used in Example 41 was replaced by the ethylene copolymer-5 from Comparative Example 1. The calendering processability of the obtained ethylene copolymer composition is described in Table 6.

Comparative Example 42

The procedures in Example 41 were repeated, except that the ethylene copolymer-1 used in Example 41 was replaced by the ethylene copolymer-6 from Comparative Example 2. The calendering processability of the obtained ethylene copolymer composition is described in Table 6.

Comparative Example 43

With an MS pressure kneader (manufactured by MORIYAMA COMPANY LTD., DS3-10MWB-E, volume 3.0 L), 175 parts by mass of EP98 (terpolymer: 100 parts by mass+extender oil: 75 parts by mass) described in Comparative Example 3 was kneaded together with 125 parts by mass of process oil: PW-380 (product name, manufactured by Idemitsu Kosan Co., Ltd.) as a plasticizer.

The kneading conditions were such that the rotor rotational speed was 50 rpm, the floating weight pressure was 3 kg/cm$^2$, the kneading time was 20 minutes, and the kneadate discharge temperature was 142° C. The calendering processability of the obtained ethylene copolymer composition is described in Table 6.

Comparative Example 44

The procedures in Example 41 were repeated, except that the ethylene copolymer-1 used in Example 41 was replaced by the ethylene copolymer-7 from Comparative Example 4. The calendering processability of the obtained ethylene copolymer composition is described in Table 6.

TABLE 6

| Calendering processability | Ex. 41 | Ex. 42 | Ex. 43 | Ex. 44 | Comp. Ex. 41 | Comp. Ex. 42 | Comp. Ex. 43 | Comp. Ex. 44 |
|---|---|---|---|---|---|---|---|---|
| (1) Roll workability | ○ | ○ | ○ | ○ | Δ | x | x | Δ |
| (2) Bank shape | ○ | ○ | ○ | ○ | Δ | Δ | Δ | ○ |
| (3) Surface texture | ○ | ○ | ○ | ○ | x | x | x | x |

Properties of films (sheets) obtained in examples and comparative examples were measured in accordance with the following methods.

[Amount of Extender Oil]

A film (sheet) was cut to a specimen which was a collection of approximately 1 mm×1 mm×1 mm cubes, and 1 g (W0) of the specimen was weighed and placed in a glass filter (G3). Methyl ethyl ketone 200 ml was placed into a flask and was heated with a heater. When the liquid boiled, the glass filter containing the specimen was placed therein and extraction was performed for 2 hours. After the extraction, the specimen was dried at 105° C. for 1 hour, and the weight (W1) of the specimen was measured. The amount of extender oil was determined by the following equation.

Amount of extender oil $(phr)=(W0-W1)/W1\times100$

[Hardness Test]

The hardness (type A durometer, HA) of the sheet was measured with respect to an approximately 12 mm thick stack which consisted of twelve sheets of 1 mm thick rubber shaped articles having flat surfaces, the sheets being stacked on top of one another via flat portions. Here, test pieces having contaminations, bubbles or scratches were rejected. The size of the measurement face of the test piece was such that the measurement could be performed while the tip of the probe was placed at a position at least 12 mm away from the end of the test piece.

[Tensile Test]

A tensile test was carried out at a measurement temperature of 23° C. and a stress rate of 500 mm/min in accordance with JIS K 6251 to determine the tensile strength at break (TB) and the elongation at break (EB) of the sheet.

Example 51

With an MS pressure kneader (manufactured by MORIYAMA COMPANY LTD., DS3-10MWB-E, volume 3.0 L), 100 parts by mass of the ethylene copolymer-1 from Example 1 was kneaded together with 120 parts by mass of process oil: "PW-380" (product name, manufactured by Idemitsu Kosan Co., Ltd.) as a plasticizer.

The kneading conditions were such that the rotor rotational speed was 50 rpm, the floating weight pressure was 3 kg/cm², the kneading time was 20 minutes, and the kneadate discharge temperature was 156° C.

Next, 120 g of the copolymer composition was wrapped around two rolls (6-inch rolls manufactured by NIPPO KOHKI K. K.) and was cut for 3 minutes at a roll temperature of 150° C., a guide width of 30 cm and a roll gap of 1 mm. Thereafter, the composition was allowed to stand for 5 minutes and was removed from the rolls. Thus, a sheet with a thickness of 1 mm was obtained.

The properties of the obtained sheet are described in Table 7.

Example 52

A sheet was obtained in the same manner as in Example 51, except that the amount of the plasticizer used in Example 51 was changed to 200 parts by mass.

The properties of the obtained sheet are described in Table 7.

Example 53

A sheet was obtained in the same manner as in Example 52, except that the ethylene copolymer-1 used in Example 52 was replaced by the ethylene copolymer-2 from Example 2.

The properties of the obtained sheet are described in Table 7.

Example 54

A sheet was obtained in the same manner as in Example 52, except that the ethylene copolymer-1 used in Example 52 was replaced by the ethylene copolymer-3 from Example 3.

The properties of the obtained sheet are described in Table 7.

Example 55

The sheet obtained in Example 52 was irradiated with electron beams at a dose of 60 kGy to produce a crosslinked sheet.

The properties of the obtained sheet are described in Table 7.

Comparative Example 51

An attempt was made to prepare a sheet in the same manner as in Example 52, except that the ethylene copolymer-1 used in Example 52 was replaced by the ethylene copolymer-5 from Comparative Example 1. However, the copolymer composition exhibited heavy stickiness to make calendering difficult, and the sheet production was infeasible.

TABLE 7

| | Ex. 51 | Ex. 52 | Ex. 53 | Ex. 54 | Ex. 55 |
|---|---|---|---|---|---|
| Electron beam irradiation | No | ← | ← | ← | Yes |
| Properties of formed sheets | | | | | |
| (1) Hardness (HA) | 32 | 19 | 23 | 24 | 18 |
| (2) Tensile strength at break (TB)/MPa | 4.6 | 4.5 | 5.8 | 5.7 | 4.3 |
| (3) Elongation at break (EB)/% | 760 | 1060 | 980 | 900 | 860 |

Example 61

With an MS pressure kneader (manufactured by MORIYAMA COMPANY LTD., DS3-10MWB-E, volume 3.0 L), 100 parts by mass of the ethylene copolymer-4 from Example 4 was kneaded together with 250 parts by mass of process oil: PW-100 (product name, manufactured by Idemitsu Kosan Co., Ltd.) as a plasticizer.

The kneading conditions were such that the rotor rotational speed was 50 rpm, the floating weight pressure was 3 kg/cm², the kneading time was 20 minutes, and the kneadate discharge temperature was 150° C. The obtained ethylene copolymer composition was formed into a film with the aforementioned six calender rolls. The results are described in Table 8.

Comparative Example 61

With an MS pressure kneader (manufactured by MORIYAMA COMPANY LTD., DS3-10MWB-E, volume 3.0 L), 100 parts by mass of the ethylene copolymer-7 from Comparative Example 4 was kneaded together with 120 parts by mass of process oil: PW-100 (product name, manufactured by Idemitsu Kosan Co., Ltd.) as a plasticizer.

The kneading conditions were such that the rotor rotational speed was 50 rpm, the floating weight pressure was 3 kg/cm², the kneading time was 20 minutes, and the kneadate discharge temperature was 150° C. The obtained ethylene copolymer composition was formed into a film with the aforementioned six calender rolls. The results are described in Table 8.

[Surface Smoothness]

Calendering was performed with 200 φL×700 mm complex six calender rolls (manufactured by Nippon Roll MFG. Co., Ltd.). The roll arrangement is illustrated in FIG. 1. The size of each roll was 200 mm in diameter and 700 mm in width, and the unit was composed of complex six rolls. The temperatures of the rolls were No. 1/No. 2/No. 3/No. 4/No. 5/No. 6=70/70/65/70/65/70° C. The gap between the fifth roll and the sixth roll was 0.45 mm. The surface condition of the obtained film was evaluated.

TABLE 8

|  | Ex. 61 | Comp. Ex. 61 |
|---|---|---|
| Specimens | Ethylene copolymer-4 (Extended by PW-100: 250 parts by mass) | Ethylene copolymer-7 (Extended by PW-100: 120 parts by mass) |
| Film thickness | 400 μm | 600 μm |
| <Surface smoothness> |  |  |
| Surface condition | ○: Excellent | X: Poor |
| Number of hollows | 0 | 6 |

The specimen in Comparative Example 61 had large die swelling and a consequent larger film thickness than in Example 61.

Number of hollows: The number of hollows having a depth equal to or larger than the film thickness×0.1 in an area within 2 cm in the TD.

Example 71

The ethylene copolymer-4 obtained in Example 4 was formed into a film with the aforementioned six calender rolls. Here, the gap between the fifth roll and the sixth roll was 0.31 mm. The film obtained by calendering was irradiated with electron beams at a dose of 60 kGy to produce a crosslinked sheet.

The properties of the obtained film were measured by the aforementioned methods. The results are described in Table 9.

Comparative Example 71

The ethylene copolymer-7 obtained in Comparative Example 4 was formed into a film with the aforementioned six calender rolls. Here, the gap between the fifth roll and the sixth roll was 0.31 mm. The film obtained by calendering was irradiated with electron beams at a dose of 60 kGy to produce a crosslinked sheet.

The properties of the obtained film were measured by the aforementioned methods. The results are described in Table 9.

TABLE 9

|  |  | Ex. 71 Ethylene copolymer-4 (Extended by PW-100: 250 parts by mass) | | Ex. 71 Ethylene copolymer-4 (Extended by PW-100: 250 parts by mass) | | Comp. Ex. 71 Ethylene copolymer-7 (Extended by PW-100: 120 parts by mass) | |
| Specimens |  | | | | | | |
| [Shaping conditions] | | | | | | | |
| Electron beam dose | kGy | 0 | | 60 | | 0 | |
| Film thickness | μm | 200 | | 200 | | 200 | |
| [Film properties] | | | | | | | |
| Measurement direction | | MD | TD | MD | TD | MD | TD |
| Hardness (HA) | | 22 | 20 | 20 | 21 | — | — |
| Break tensile strength | MPa | 5.7 | 9.3 | 3.2 | 7.6 | 1.7 | 1.4 |
| Break elongation | % | 550 | 940 | 510 | 910 | 1200 | 1200 |

MD: Film machine direction, TD: Transverse direction perpendicular to the film machine direction

INDUSTRIAL APPLICABILITY

The films of the invention are excellent in calendering properties and have flexibility and high stretchability. Due to these characteristics, the inventive films are promising alternatives to films such as vinyl chloride or silicon rubber films, and can be used in various applications such as various leathers, sheets, films and stacked films.

REFERENCE SIGNS LIST 1 to 6: FIRST TO SIXTH CALENDER ROLLS
7: FILM

The invention claimed is:

1. An ethylene copolymer (X), which satisfies the following (i) and (ii), comprising structural units derived from a component [A], a component [B] and a component [C] which are ethylene [A], an α-olefin of 3 to 20 carbon atoms [B] and a polyene and/or a cyclic olefin [C],
   (1) the content of structural units derived from the ethylene [A] being in the range of 50 to 90 mol% in 100 mol% of all the structural units in the copolymer (X);
   (2) the content of structural units derived from the polyene and/or the cyclic olefin [C] being in the range of 1.0 to 5.0 mol% in 100 mol% of all the structural units in the copolymer (X);
   (3) the intrinsic viscosity [η] of the ethylene copolymer (X) as measured at 135° C. in a decalin solution being in the range of 7.8 to 13.0 dl/g,
   (i) the value B obtained from a $^{13}$C-NMR spectrum based on the following equation is 0.9 to 1.0:

Value $B=[P_{OE}]/(2\cdot[P_E]\cdot[P_O])$ (in the equation, $[P_E]$ is the molar fraction of the content of the units derived from ethylene (a) in the random copolymer, [P$_O$] is the molar fraction of the content of the units derived from the α-olefin (b) in the random copolymer, and [P$_{OE}$] is the proportion of the number of α-olefin ethylene chains relative to the number of all the dyad chains in the random copolymer); and (ii) the loss tangent value, tan δ, as determined by dynamic viscoelasticity measurement at −10° C. and 1 Hz is not more than 0.1.

2. The ethylene copolymer according to claim 1, wherein the component [C] is at least one or more components selected from polyenes.

3. The ethylene copolymer according to claim 1, wherein the ethylene copolymer (X) has an intrinsic viscosity [η] in the range of 8.0 to 13.0 dl/g as measured at 135° C. in a decalin solution.

4. The ethylene copolymer according to claim 1, wherein the component [C] is 5-ethylidene-2-norbornene (ENB).

5. The ethylene copolymer according to claim 1, wherein the component [B] is propylene or 1-butene.

6. An ethylene copolymer composition comprising 100 parts by mass of the ethylene copolymer (X) according to claims 1, and 100 to 1000 parts by mass of a plasticizer (Y).

7. The ethylene copolymer composition according to claim 6, wherein the ethylene copolymer composition has a loss tangent (tan δ) at 190° C. and 0.01 rad/sec of 0.1 to 1.0.

8. A crosslinked product obtained by crosslinking the ethylene copolymer according to claim 1.

9. A rubber shaped article comprising the crosslinked product according to claim 8.

10. A film or sheet comprising the ethylene copolymer (X) according to claim 1.

11. The film or sheet according to claim 10, wherein the component [C] is 5-ethylidene-2-norbornene (ENB).

12. The film or sheet according to claim 10, comprising 100 to 1000 parts by mass of a plasticizer (Y) with respect to 100 parts by mass of the ethylene copolymer (X).

13. The film or sheet according to claim 12, wherein the plasticizer (Y) is a petroleum plasticizer.

14. The film or sheet according to claim 10, which has a durometer type A hardness measured by a method specified in JIS K 6253 of 10 to 80.

15. The film or sheet according to claim 10, wherein at least part of the ethylene copolymer (X) has been crosslinked by electron beam crosslinking.

16. The film or sheet according to claim 15, which has been crosslinked with an electron beam at a dose of 10 to 200 kGy.

17. A method for forming films or sheets comprising forming with a calendaring machine films or sheets comprising the ethylene copolymer (X) according to claim 1.

18. The film or sheet according to claim 10, which is a calendered article obtained by calendering.

19. A crosslinked product obtained by crosslinking the ethylene copolymer composition according to claim 6.

* * * * *